US011696131B2

(12) United States Patent
Chan et al.

(10) Patent No.: US 11,696,131 B2
(45) Date of Patent: *Jul. 4, 2023

(54) METHODS AND APPARATUS FOR PROCESSING DATA PACKETS ORIGINATED FROM A MOBILE COMPUTING DEVICE TO DESTINATIONS AT A WIRELESS NETWORK NODE

(71) Applicant: Pismo Labs Technology Limited, Kowloon (HK)

(72) Inventors: Ho Ming Chan, Quarry Bay (HK); Ka Kei Liu, Kennedy Town (HK)

(73) Assignee: Pismo Labs Technology Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/384,311

(22) Filed: Jul. 23, 2021

(65) Prior Publication Data

US 2021/0352477 A1 Nov. 11, 2021

Related U.S. Application Data

(63) Continuation of application No. 15/948,647, filed as application No. PCT/IB2017/052753 on May 11, 2017, now Pat. No. 11,076,287.

(51) Int. Cl.
*H04W 12/06* (2021.01)
*G06Q 50/00* (2012.01)
*H04L 9/40* (2022.01)

(52) U.S. Cl.
CPC ............ *H04W 12/06* (2013.01); *G06Q 50/01* (2013.01); *H04L 63/083* (2013.01)

(58) Field of Classification Search
CPC ...... H04W 12/06; H04W 12/71; G06Q 50/01; H04L 63/083
See application file for complete search history.

(56) References Cited

U.S. PATENT DOCUMENTS

| 7,209,739 B1 | 4/2007 | Narayanabhatla |
| 2003/0045287 A1 | 3/2003 | Taniguchi |
| (Continued) | | |

FOREIGN PATENT DOCUMENTS

| CN | 1830190 | 9/2006 |
| CN | 102017577 | 4/2011 |
| (Continued) | | |

OTHER PUBLICATIONS

First Office Action of Chinese Patent Application No. 2017800616528, dated Jun. 3, 2021.

(Continued)

*Primary Examiner* — Adil Ocak
(74) *Attorney, Agent, or Firm* — Fisherbroyles, LLP; James Pohl

(57) ABSTRACT

Methods and apparatus for processing data packets originated from a mobile computing device to destinations at a wireless network node. The wireless network node receives an access request from the mobile computing device for the data packet transmission to the destinations and determines an identifier of the mobile computing device. The wireless network node then determines whether the identifier is in a wireless network node database. When the identifier is not in the wireless network node database, the wireless network node suspends to process data packets received from the mobile computing device and communicates with a server to determine whether status of the mobile computing device in a server database is the first state.

20 Claims, 18 Drawing Sheets

(56) References Cited

U.S. PATENT DOCUMENTS

| | | | |
|---|---|---|---|
| 2012/0198539 A1 | 8/2012 | Liu | |
| 2013/0019295 A1 | 1/2013 | Park | |
| 2013/0155876 A1 | 6/2013 | Potra | |
| 2013/0346564 A1* | 12/2013 | Warrick | H04L 65/1045 709/219 |
| 2011/1073682 | 7/2014 | Group | |
| 2018/0255474 A1 | 9/2018 | Toth | |
| 2019/0075114 A1* | 3/2019 | Pugaczewski | H04L 61/5007 |

FOREIGN PATENT DOCUMENTS

| | | |
|---|---|---|
| CN | 103188248 | 7/2013 |
| CN | 104871203 | 8/2015 |
| CN | 104936177 | 9/2015 |
| KR | 20010046989 | 6/2001 |

OTHER PUBLICATIONS

International Search Report in international Application No. PCT/IB2017/052753, dated Jan. 25, 2018.
Written Opinion of the international Searching Authority in international Application No. PCT/IB2017/052753, dated Jan. 25, 2018.

* cited by examiner

METHODS AND APPARATUS FOR PROCESSING DATA PACKETS ORIGINATED FROM A MOBILE COMPUTING DEVICE TO DESTINATIONS AT A WIRELESS NETWORK NODE

RELATED APPLICATIONS

The present application is a non-provisional continuation application which claims the benefits of and is based on U.S. application Ser. No. 15/948,647 filed on Apr. 9, 2018 which claims the benefits of and is based on PCT application Serial No. PCT/IB2017/052753 filed on May 11, 2017, the disclosures of which are hereby incorporated by specific reference thereto.

TECHNICAL FIELD

The present invention relates to processing data packets originated from a mobile computing device to destinations at a wireless network node.

BACKGROUND ART

Using a public WLAN service is one of the most common ways for a user of a mobile computing device to access Internet. The user is required to do an authentication at a captive portal webpage before using the public WLAN service. Once the authentication is successful, the user is allowed to use the public WLAN service within a predetermined period. In a large area, such as a shopping mall, a stadium, a campus, a public WLAN service provider uses a plurality of wireless network nodes to cover most of the area in order to provide stable WLAN service to public. It is desirable for the user to do a single authentication in order to use the WLAN service within the large area when the user is moving from one wireless network node signal coverage to another wireless network node signal coverage. However, the user is sometimes required to redo an authentication when moving from one wireless network node to another wireless network node even the predetermined period has not expired.

SUMMARY OF THE INVENTION

The present invention discloses methods and apparatus for processing data packets originated from a mobile computing device to destinations at a wireless network node. The wireless network node receives an access request from the mobile computing device for the data packet transmission to the destinations and determines an identifier of the mobile computing device. The wireless network node then determines whether the identifier is in a wireless network node database. When the identifier is in the wireless network node database, the wireless network node determines whether status of the mobile computing device is a first state. When the status of the mobile computing device is the first state, the wireless network node allows the mobile computing device to transmit data packets to the destinations. When the status of the mobile computing device is a second state, the wireless network node redirects the mobile computing device to do an authentication. When the identifier is not in the wireless network node database, the wireless network node suspends to process data packets received from the mobile computing device and communicates with a server to determine whether status of the mobile computing device in a server database is the first state. When the status of the mobile computing device in the server database is the first state, the wireless network node updates the status of the mobile computing device in the wireless network node database with the first state and allows the mobile computing device to transmit the data packets to the destinations. When the status of the mobile computing device in the server database is not the first state, the wireless network node updates the wireless network node database with the second state and redirects the mobile computing device to do an authentication.

According to one of the embodiments of the present invention, the wireless network node, when the authentication is successful, updates the status of the mobile computing device with the first state in the wireless network node database and allows the wireless device to transmit the data packets to the destinations upon a successful authentication.

According to one of the embodiments of the present invention, the wireless network node does not allow the mobile computing device to transmit data packets to the destinations when the authentication is unsuccessful.

According to one of the embodiments of the present invention, the mobile computing device includes at least one web browser. The web-browser is redirected to a captive portal webpage for a user of the mobile computing device to do the authentication. The captive portal webpage includes multiple of social media links for the user of the mobile computing device to select to do the authentication. The authentication is done at the captive portal webpage by manually entering a registered username and password for one of the multiple of social media links that is selected by the user.

According to one of the embodiments of the present invention, the identifier is Media Access Control (MAC) address of the wireless device.

According to one of the embodiments of the present invention, the first state relates to an identity of the user of the mobile computing device being successfully authenticated and the second state relates to an identity of the user of the mobile computing device not being successfully authenticated.

BRIEF DESCRIPTION OF THE DRAWINGS

In order that the present invention is more fully understood, reference shall now be made to the figures as shown in the accompanying drawing sheets, wherein.

DETAILED DESCRIPTIONS

Figure 1:
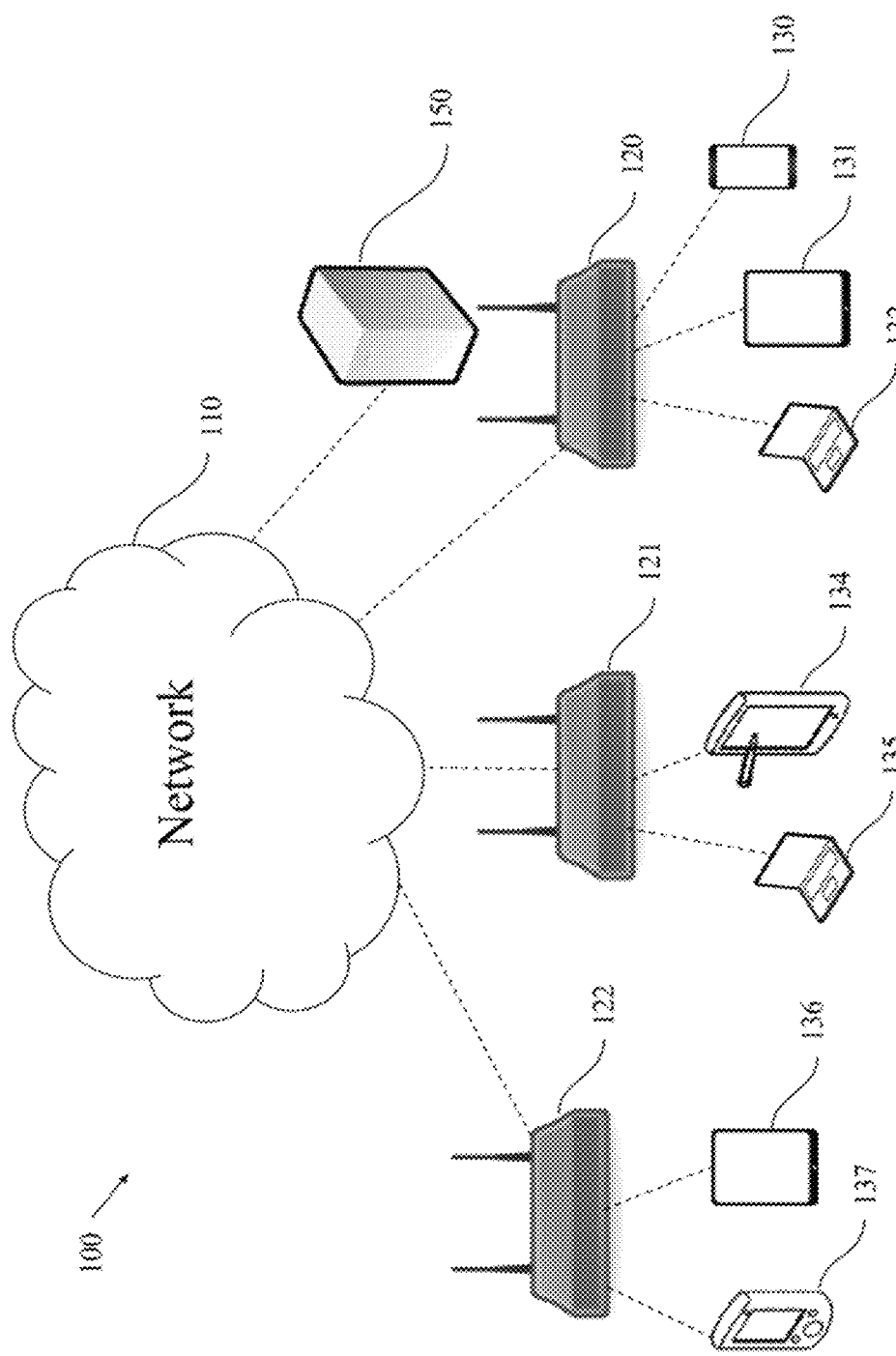
FIG. 1 illustrates a network system according to one of the embodiments of the present invention.

The ensuing description provides preferred exemplary embodiment(s) and exemplary embodiments only, and is not intended to limit the scope, applicability or configuration of the invention. Rather, the ensuing description of the preferred exemplary embodiment(s) and exemplary embodiments will provide those skilled in the art with an enabling description for implementing a preferred exemplary embodiment of the invention. It is understood that various changes may be made in the function and arrangement of elements without departing from the spirit and scope of the invention as set forth in the appended claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage unit, such as a secondary storage.

Moreover, as disclosed herein, the term "secondary storage" and "main memory" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data. A machine-readable medium can be realized by virtualization, and can be a virtual machine readable medium including a virtual machine readable medium in a cloud-based instance.

Furthermore, embodiments may be implemented by hardware, software, firmware, middleware, microcode, hardware description languages, or any combination thereof. When implemented in software, firmware, middleware or microcode, the program instructions or code segments to perform the necessary tasks may be stored in a machine-readable medium such as storage unit. A processing unit(s) may perform the necessary tasks. A processing unit(s) can be a CPU, an ASIC semiconductor chip, a semiconductor chip, a logical unit, a digital processor, an analog processor, a FPGA or any processor that is capable of performing logical and arithmetic functions. A program instruction may represent a procedure, a function, a subprogram, a program, a routine, a subroutine, a module, a software package, a class, or any combination of instructions, data structures, or program statements. A program instruction may be coupled to another program instruction or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. A processing unit(s) can be realized by virtualization, and can be a virtual processing unit(s) including a virtual processing unit in a cloud-based instance.

A network interface may be implemented by a standalone electronic component or may be integrated with other electronic components. A network interface may have no network connection or at least one network connection depending on the configuration. A network interface is only connected to one accessible network. Therefore, there may be more than one network connection being carried by one accessible network. A network interface may be an Ethernet interface, a frame relay interface, a fiber optic interface, a cable interface, a DSL interface, a token ring interface, a serial bus interface, a universal serial bus (USB) interface, Firewire interface, Peripheral Component Interconnect (PCI) interface, etc.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The program instructions may, in certain embodiments, be downloaded via computer networks such as the Internet, an intranet, LAN, MAN, WAN, the PSTN, a satellite communication system, a cable transmission system, and/or the like.

FIG. 1 illustrates network system 100 according to one of the embodiments of the present invention. Network system 100 includes network 110, a plurality of wireless network nodes 120, 121 and 122, a plurality of mobile computing devices 130, 131, 132, 133, 134, 135, 136 and 137 and server 150.

Wireless network nodes 120, 121 and 122 may include a router, a gateway, a modem, a network switch, or other suitable device for providing mobile computing devices 130,131, 132, 133, 134, 135, 136 and 137 an access to network 110 for data transmission and data reception. Wireless network nodes 120, 121,122 are capable of communicating with mobile computing devices 130, 131, 132, 133, 134, 135, 136 and 137 via a wired or a wireless link. Wireless network nodes 120, 121 and 122 is also capable of communicating with network 110 via a wired or a wireless link.

Mobile computing devices 130, 131, 132, 133, 134, 135, 136 and 137 may include a smartphone, a tablet computer, a personal digital assistant (PDA), an e-reader or a laptop computer. Mobile computing devices 130, 131, 132, 133, 134, 135, 136 and 137 may also include functionality for wireless communication, such as BLUETOOTH communication, near-field communication (NFC), infrared (IR) communication, communication with a wireless local area network (WLAN) or cellular-telephone network.

Figure 3:
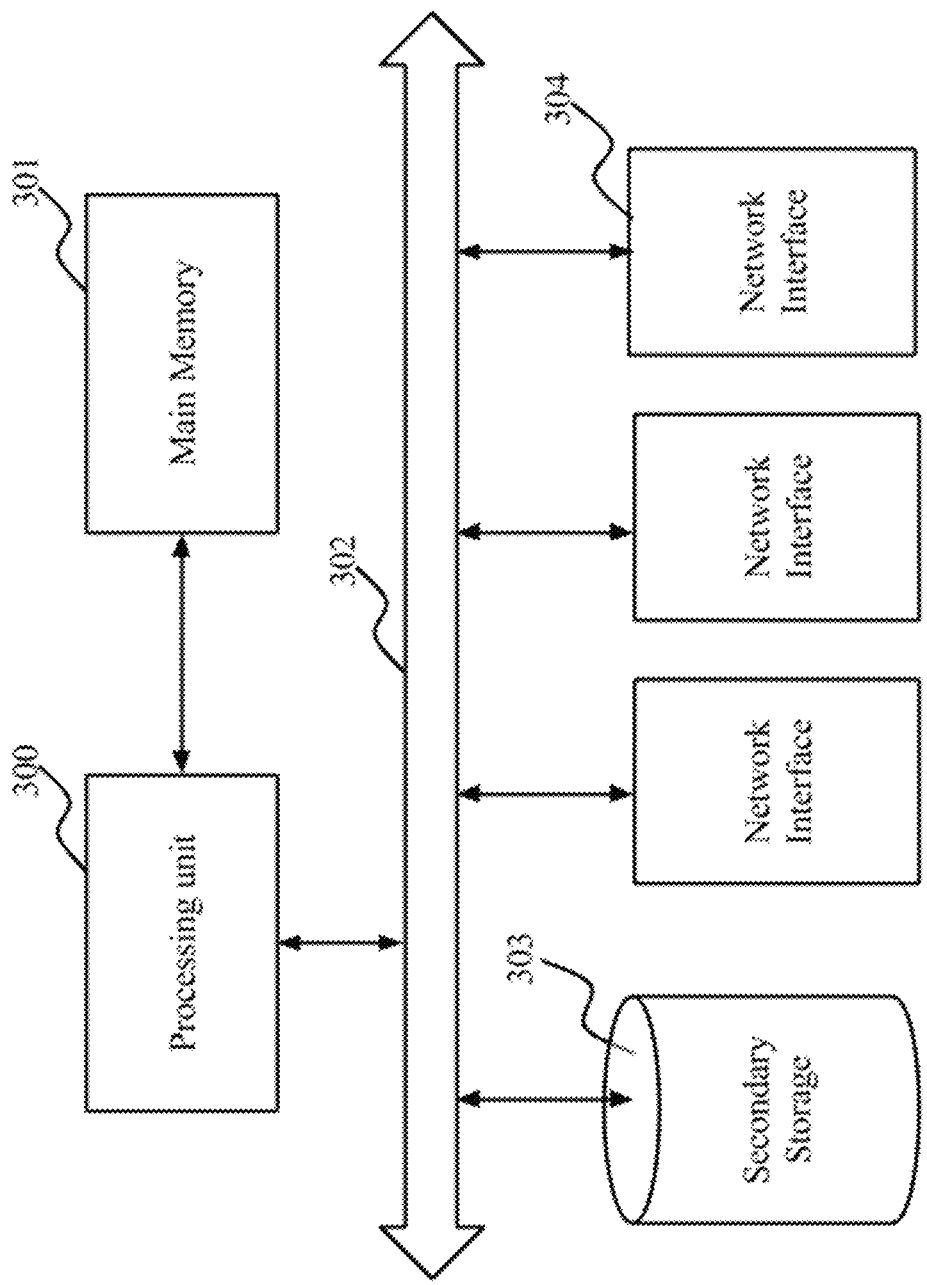
FIG. 3 illustrates a block diagram of a network node according to one of the embodiments of the present invention.

FIG. 3 is an illustrative block diagram of network node 120 according to one of the embodiments of the present invention. Network node 120 comprises processing unit 300, main memory 301, system bus 302, secondary storage 303, and plurality of network interfaces 304. Processing unit 300 and main memory 301 are connected to each other directly. System bus 302 connects processing unit 300 directly or indirectly to secondary storage 303, and plurality of network interfaces 304. Using system bus 302 allows network node 120 to have increased modularity. System bus 302 couples processing unit 300 to secondary storage 303, and plurality of network interfaces 304.

System bus 302 can be any of several types of bus structures including a memory bus, a peripheral bus, and a local bus using any of a variety of bus architectures. Secondary storage 303 stores program instructions for execution by processing unit 300. Secondary storage 303 further stores conditions, wherein classification of established end-to-end connections into different groups depends on whether or not the established end-to-end connections satisfy the conditions.

Figure 4:
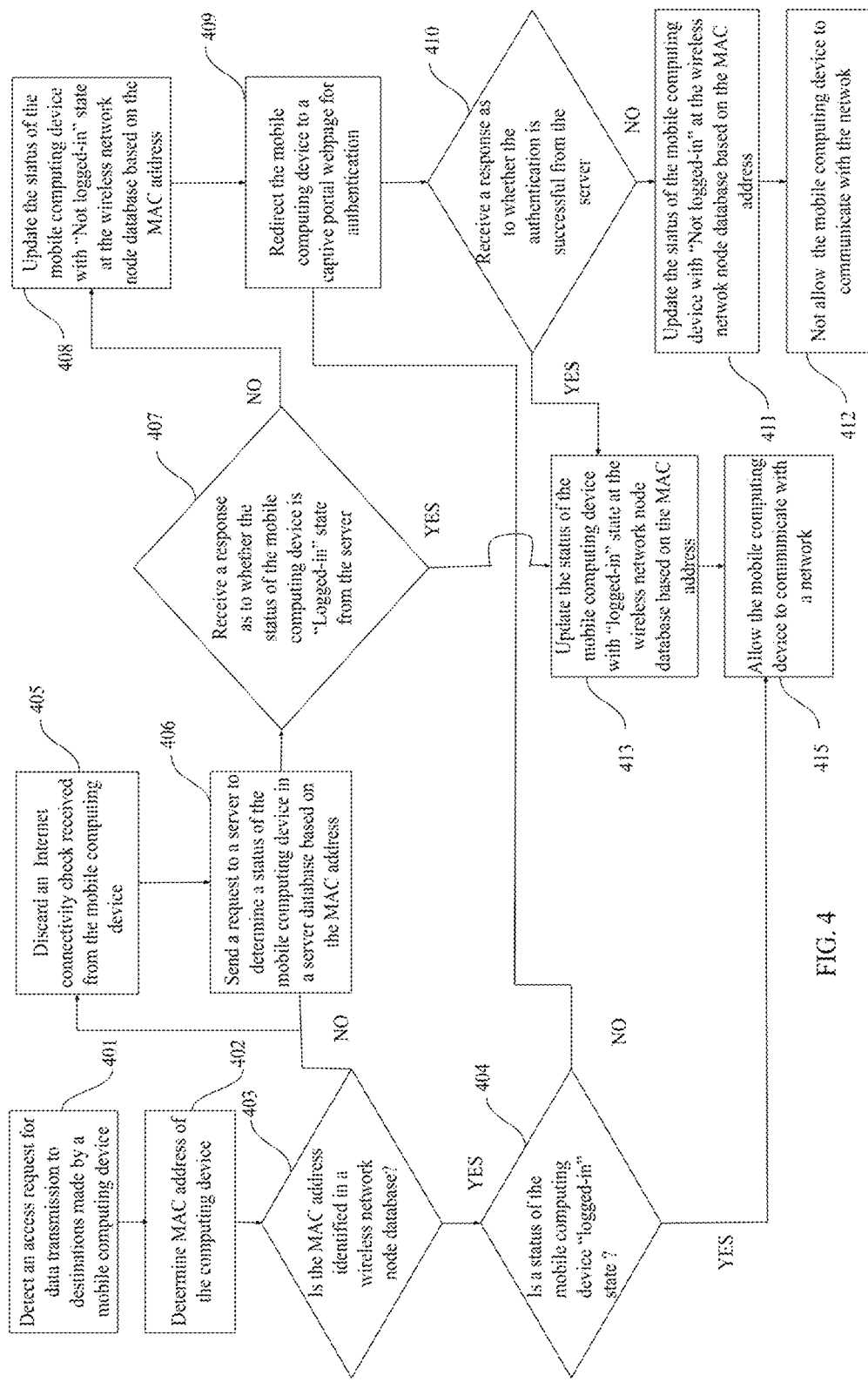
FIG. 4 illustrates a workflow of authenticating a mobile computing device at a wireless network node according to one of the embodiments of the present invention.

FIG. 4 illustrates a workflow of authenticating a mobile computing device at a wireless network node. A wireless network node communicates with mobile computing devices via WLAN connection.

In one particular embodiment, mobile computing device 130 is located within WLAN signal range of wireless network node 120. If a user of mobile computing device 130 wishes to communicate with network 110 via wireless network node 120 in order to reduce mobile data consumption or obtain more stable network connection, the user turns on a WLAN transceiver of mobile computing device 130 in order to attempt to connect with wireless network node 120 via WLAN connection.

Wireless network node 120 detects mobile computing device 130 within its WLAN signal range. At Step 401, an access request made by mobile computing device 130 is received by wireless network node 120. Mobile computing device 130 sends access request 801 to wireless network node 120 as illustrated in FIG. 8-FIG. 15. Wireless network node 120 then returns access request acknowledgement 802 to mobile computing device 130.

Wireless network node 120 then determines the identity of mobile computing device 130 at Step 402. The identity, for example, is media access control (MAC) address of mobile computing device 130.

Processing unit 300 then determines whether the MAC address of mobile computing device 130 is identified in a wireless network node database stored in secondary storage 303 at Step 403.

If the MAC address is identified in the wireless network node database, processing unit 300 then determines whether status of mobile computing device 130 is "Logged-in" state or not at Step 404. If the status of mobile computing device 130 is "Logged-in" state, mobile computing device 130 is allowed to access wireless network node 120 via WLAN connection to communicate with network 110 at Step 415. A "Logged-in" state indicates that a mobile computing device has been successfully authenticated via a user of the mobile computing device to sign in or log in with a credential. The term of "Logged-in" state can be any data representation, including a binary, a string, a character or a text.

At Step 403, if the MAC address is not identified in database stored in secondary storage 303, processing unit 300 will suspend to process any Internet Protocol (IP) data packets, for example, Internet connectivity check 806, received from mobile computing device 130 at Step 405. During suspension, processing unit 300 will discard IP data packets. Wireless network node 120 then communicates with server 150 in order to determine whether status of mobile computing device 130 in a server database stored in server 150 is "Logged-in" state or not, based on the MAC address of mobile computing device 130 at Step 406.

Internet connectivity check 806 is allowed to be transmitted to predetermined destinations when wireless network node 120 grants an access to mobile computing device 130. After the predetermined destinations receive the Internet connectivity check 806, the predetermined destinations should return Internet connectivity check acknowledgement 807. The predetermined destinations are designated by vendor of mobile computing device 130 or vendor of an operating system used in mobile computing device 130.

Figure 14:
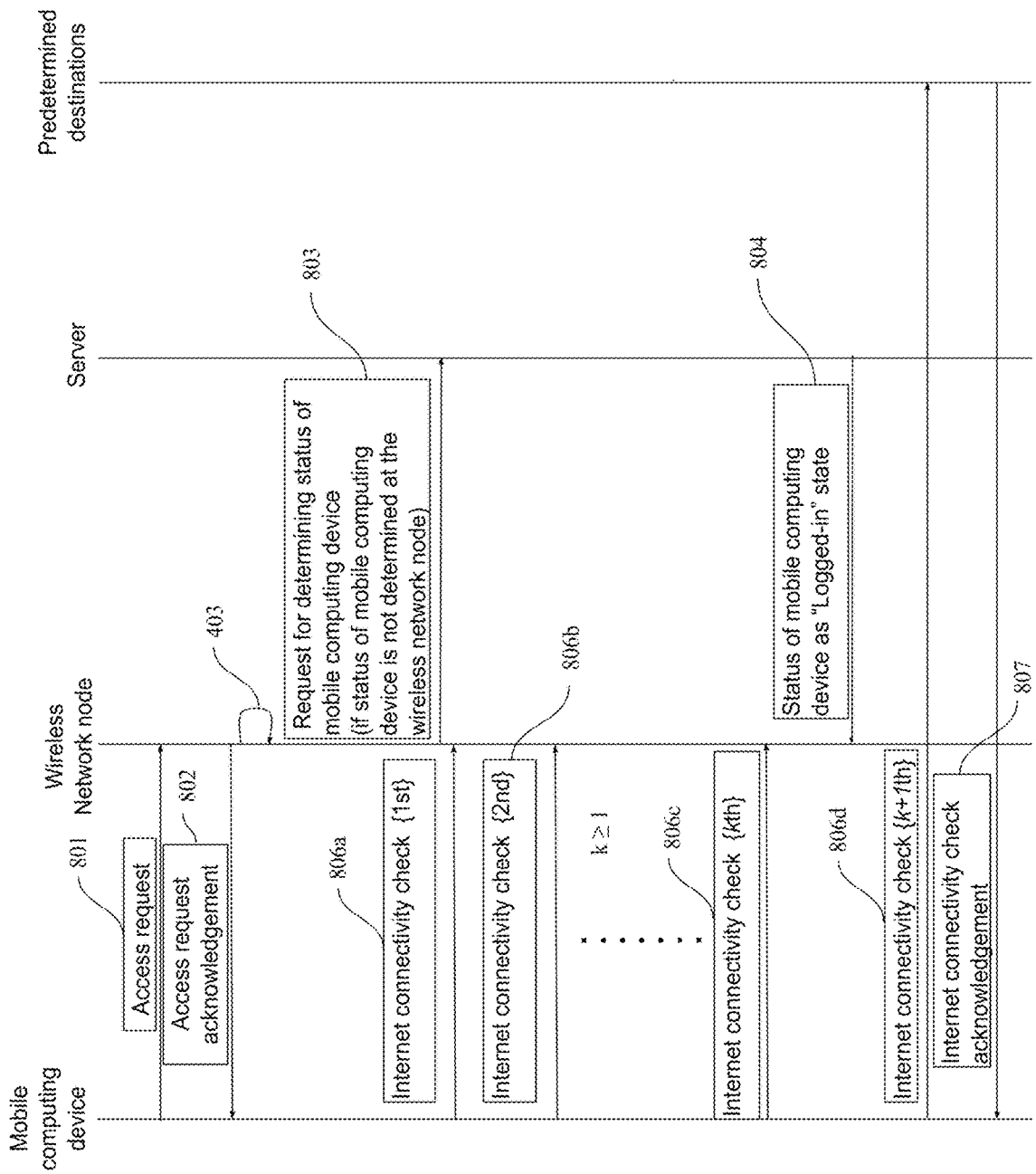
FIG. 14 illustrates a sequence diagram for a scenario that a wireless network node keeps discarding Internet connectivity check received from a mobile computing device until the wireless network node receives status of mobile computing device as "Logged-in" state from a server.
Figure 15:
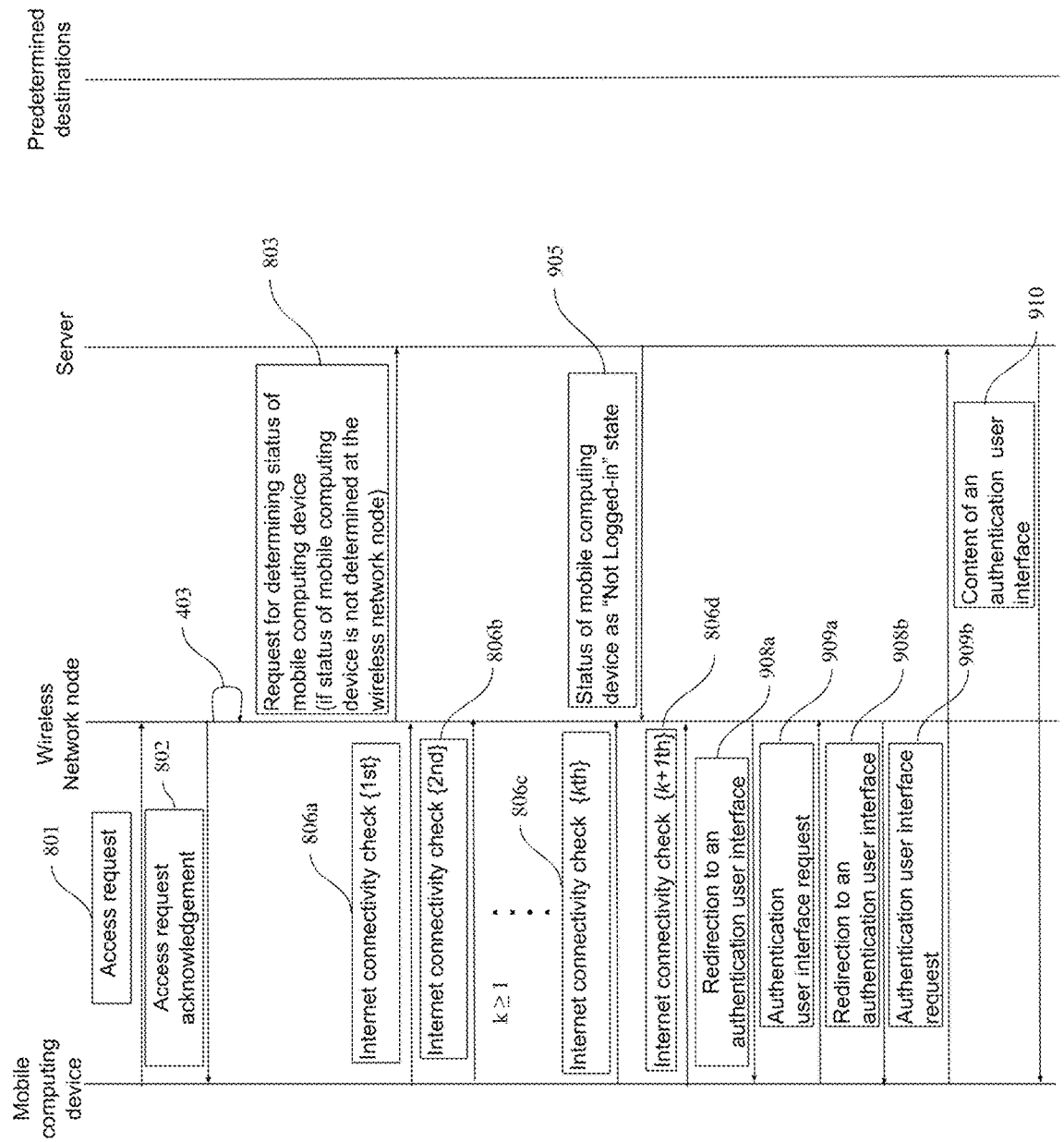
FIG. 15 illustrates a sequence diagram for a scenario that a wireless network node keeps discarding Internet connectivity check received from a mobile computing device until the wireless network node receives status of mobile computing device as "Not Logged-in" state from a server.

In the scenario illustrated by FIG. 14 and FIG. 15, wireless network node 120 sends request for determining status of mobile computing device 803 to server 150. Mobile computing device 130 sends first Internet connectivity check 806a to wireless network node 120. As wireless network node 120 has no knowledge of status of mobile computing device 130, wireless network node 120 discards first Internet connectivity check 806a and waits for status of mobile computing device as "Logged-in" state 804 or status of mobile computing device as "Not Logged-in" state 905 from server 150. Mobile computing device 130 does not receive any feedback or response from wireless network node 120. When mobile computing device 130 does not receive any feedback or response after a period of time, mobile computing device 130 sends second Internet connectivity check 806b to wireless network node 120. If wireless network node 120 has not received status of mobile computing device from server 150 when it receives second Internet connectivity check 806b, wireless network node 120 then discards second Internet connectivity check 806b.

When mobile computing device 130 repeatedly sends Internet connectivity check 806 to wireless network node 120, wireless network node 120 will then keep discarding Internet connectivity checks 806 until it receives status of mobile computing device from server 150. For illustration purpose, as the scenario illustrated in FIG. 14, wireless network node 120 keeps discarding Internet connectivity check 806 received from mobile computing device 130 until it receives status of mobile computing device as "Logged-in" state 804 from server 150. As illustrated in FIG. 14, after wireless network node 120 receives kth Internet connectivity check 806c and discards kth Internet connectivity check 806c, wireless network node 120 receives status of mobile computing device as "Logged-in" state 804 from server 150. Wireless network node 120 will then allow data packets to be transmitted from mobile computing device 130 to network 110 because mobile computing device 130 has been authenticated. When mobile computing device 130 sends k+1th Internet connectivity check 806d, which is transmitted to the predetermined destinations through wireless network node 120, the predetermined destinations should then return Internet connectivity check acknowledgement 807 to mobile computing device 130.

At Step 407, if the status of mobile computing device 130 received from server 150 is "Logged-in" state, processing unit 300 updates the wireless network node database with status of mobile computing device 130 as "Logged-in" state based on the MAC address at Step 413. Step 415 will then be performed.

If the status of mobile computing device 130 received from server 150 is "Not Logged-in" state, processing unit 300 updates the wireless network node database with the status of mobile computing device 130 as "Not Logged-in" state based on the MAC address at Step 408. A "Not Logged-in" state indicates that a mobile computing device is not authenticated. The term of "Not Logged-in" state can be any data representation, including a binary, a string, a character or a text.

At Step 409, mobile computing device 130 is redirected to a captive portal webpage for authentication. A captive portal webpage is a webpage that a user of wireless network node 120 is obliged to view and interact with before an access is granted.

Figure 7:
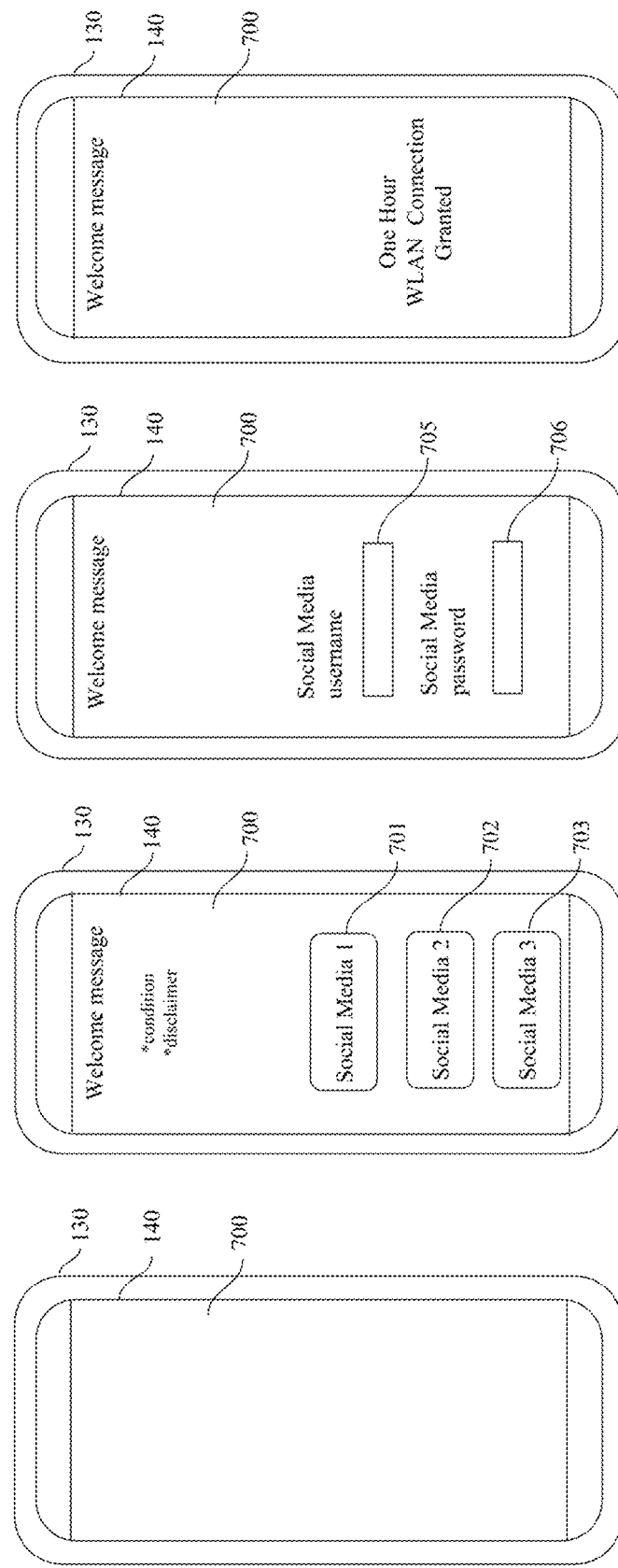
FIG. 7A to FIG. 7D illustrate a sequence of redirecting a mobile computing device to a captive portal webpage and authenticating the mobile computing device at the captive portal webpage as illustrated on a display panel of a mobile computing device according to one of the embodiments of the present invention.

FIG. 15 illustrates a scenario that wireless network node 120 keeps discarding Internet connectivity check 806 received from mobile computing device 130 until it receives status of mobile computing device as "Not Logged-in" state 905 from server 150. As mobile computing device 130 was not authenticated, wireless network node 120 does not allow any data packets to be transmitted from mobile computing device 130 to network 110. For example, wireless network node 120 receives status of mobile computing device as "Not Logged-in" state 905 after it receives kth Internet connectivity check 806c and discards kth Internet connectivity check 806c. After mobile computing device 130 sends k+1th Internet connectivity check 806d to wireless network node 120, wireless network node 120 returns "redirection to an user interface" 908a to mobile computing device 130 to indicate that no access is granted and mobile computing device is prompted to be redirected to the captive portal webpage. Web browser 700 as shown in FIG. 7 is then shown on display panel 140 of mobile computing device 130. Mobile computing device 130 then sends authentication user interface request 909a to wireless network node 120 for attempting to access the captive portal webpage. Wireless network node 120 returns "redirection to a user interface" 908b to mobile computing device. Mobile computing device 130 will then send authentication user interface request 909b, which is allowed to be transmitted to server 150. Server 150 will return content of an authentication user interface 910. The authentication user interface, for example, is a captive portal webpage.

At Step 410, processing unit 300 determines whether the authentication of mobile computing device 130 is successful or not based on a response received. If the authentication is successful, Step 413 will be performed. If the authentication is not successful, processing unit 300 will update the wireless network node database with status of mobile computing device 130 as "Not Logged-in" state based on the MAC address at Step 411 and mobile computing device 130 is not allowed to communicate with network 110 at Step 412.

At Step 404, if the status of mobile computing device 130 is "Not Logged-in" state in the wireless network node database, Steps 409 will then be performed.

In one variant, server 150 is a remote server or a cloud server, which communicates with wireless network node 120 via network 110, and not located in the same premise of or the same LAN of any of wireless network nodes 120, 121 and 122 for direct communication. One of the benefits of using a remote server or a cloud server, for example, an administrator of wireless network nodes 120, 121 and 123 is not required to setup and maintain its own server as the remote server or the cloud server may be provided by vendor of wireless network nodes 120, 121 and 122 or a third party. Further, the administrator of wireless network nodes 120, 121 and 123 is allowed to administrate network nodes 120, 121 and 122 remotely via a user interface provided by server 150.

In one variant, Step 405 is not included in the workflow as illustrated in FIG. 4. When the MAC address of mobile computing device 130 is not identified in the wireless network node database at Step 403, Step 406 will then be performed. At Step 407, wireless network node 120 receives status of mobile computing device as "Logged-in" state 804 or status of mobile computing device as "Not Logged-in" state 905 from server 150. FIG. 8 to FIG. 13 illustrate sequences of responses made by mobile computing device 130, wireless network node 130, server 150 and a predetermined destination when wireless network node 120 receives status of mobile computing device as "Logged-in" state 804 or status of mobile computing device as "Not Logged-in" state 905 at different time period.

Figure 10:
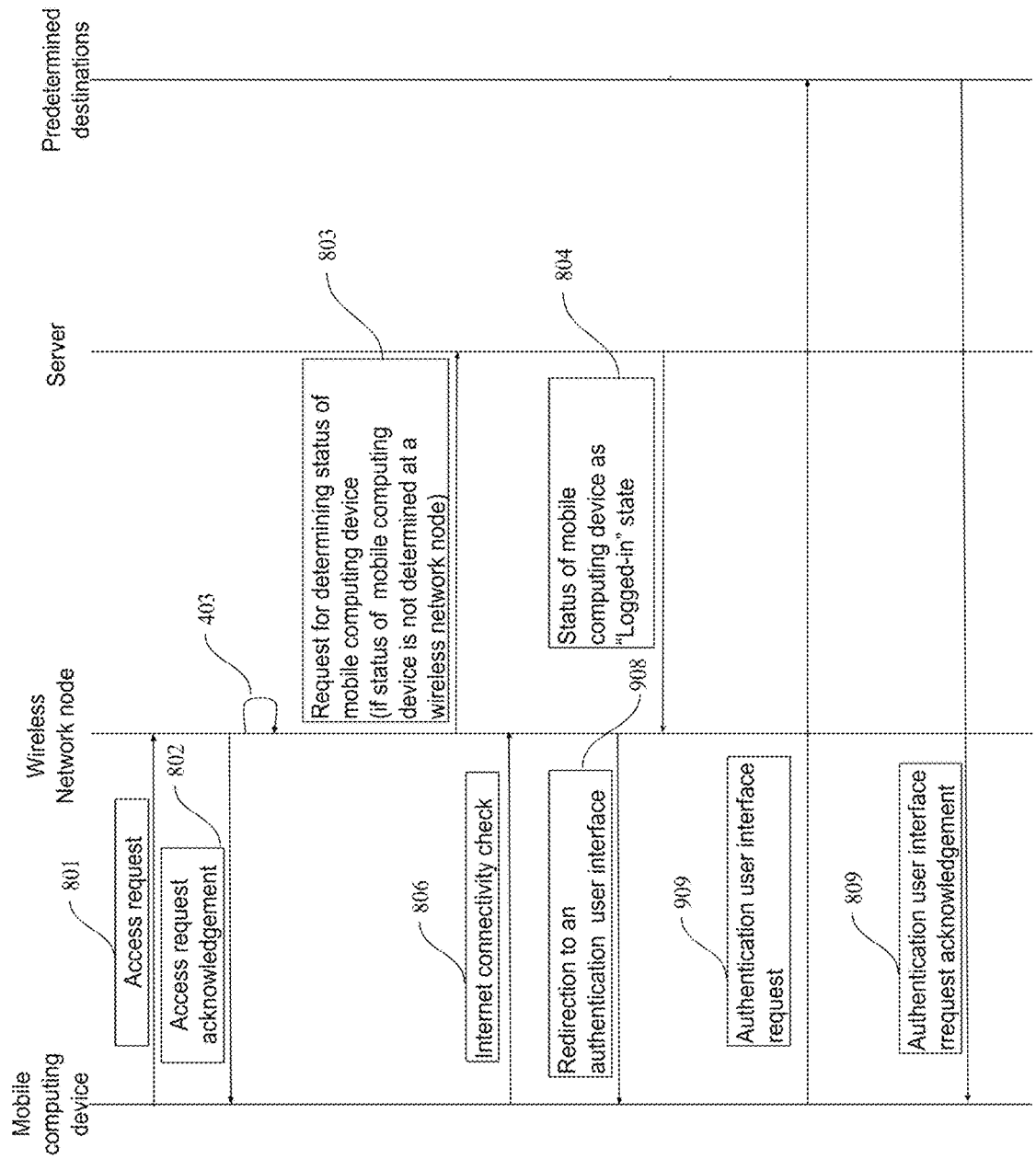
FIG. 10 illustrates a sequence diagram for a scenario that a wireless network node receives status of mobile computing device as "Logged-in" state from a server before the mobile computing device sends an authentication user interface request.

One of the advantages of including Step 405 in the workflow as illustrated in FIG. 4 is to reduce a chance of displaying a message on display panel 140 of mobile computing device 130 in comparison with the workflow of FIG. 4 without Step 405. The message may be a sentence, a word or a text. The message results from authentication user interface request acknowledgement 809 received from the predetermined destination. It is not desirable to display the message to the user of mobile computing device 130 because the message may not be a meaningful to the user or may make the user confused. The message displayed on display panel 140 results from a sequence of responses as illustrated in FIG. 10.

Another advantage of including Step 405 in the workflow as illustrated in FIG. 4 is to reduce a chance of doing authentication more than once at the captive portal webpage, in comparison with the workflow of FIG. 4 without Step 405. It is not desirable for the user of mobile computing device 130 to do authentication more than once in order to grant access to wireless network node 120 even the status of mobile computing device 130 is "Logged-in" state in server database.

Figure 5:
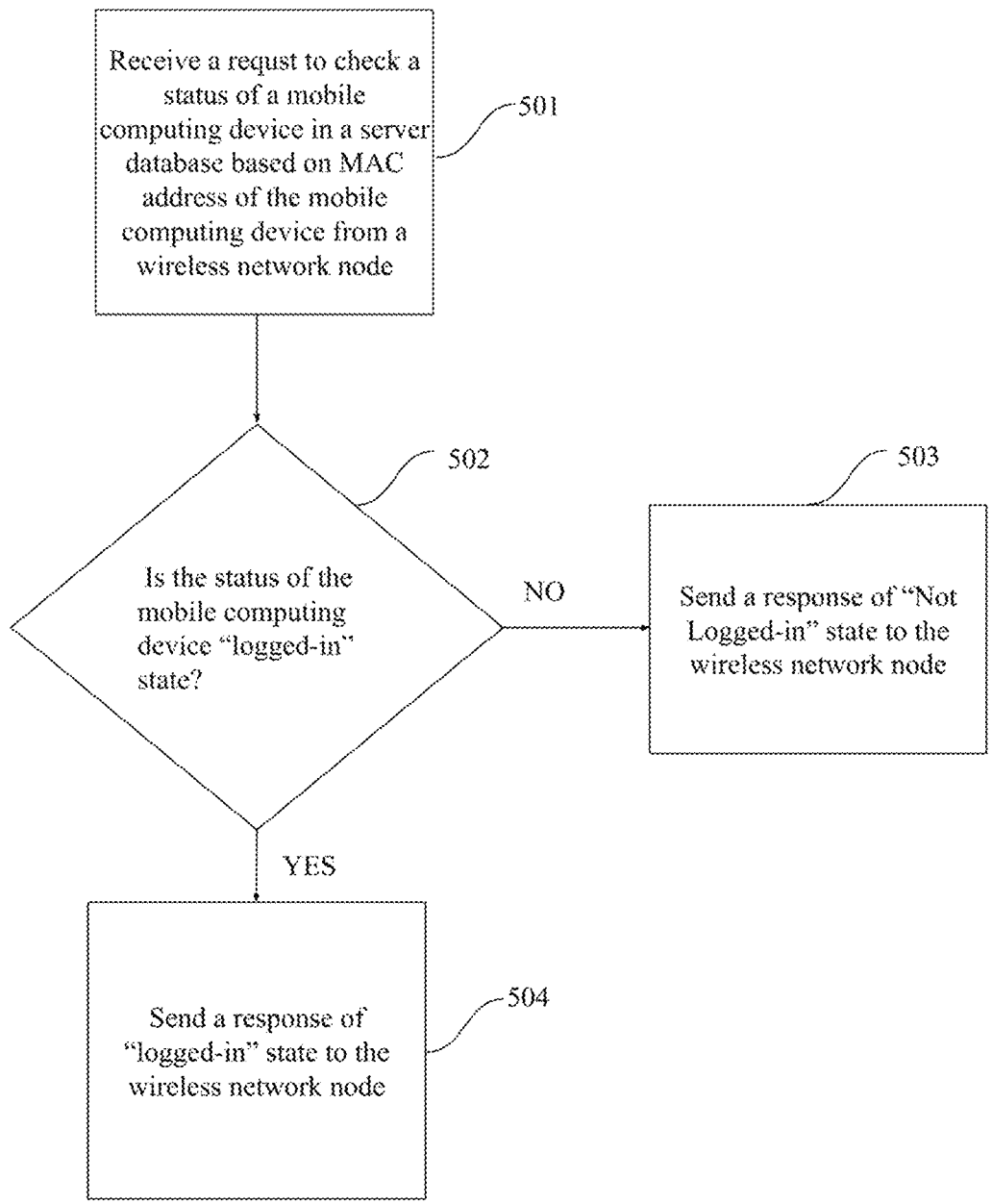
FIG. 5 illustrates a workflow of checking status of a mobile computing device in a server database at a server upon receiving a request from a wireless network node according to one of the embodiments of the present invention.

FIG. 5 illustrates actions performed by server 150 upon receipt of a request for determining status of mobile computing device 130 from wireless network node 120. At Step 501, server 150 receives a request for determining status of mobile computing device 130 in the server database based on the identification, such as, MAC address of mobile computing device 130 from wireless network node 120. At Step 502, server 150 determines whether the status of mobile computing device 130 is "Logged-in" state or not. At Step 503, if the status of mobile computing device 130 is not "Logged-in" state, status of mobile computing device as "Not Logged-in" state 905 is sent to wireless network node 120. At Step 504, if the status of mobile computing device 130 is "Logged-in" state, status of mobile computing device as "Logged-in" state 804 is sent to wireless network node 120.

Figure 6:
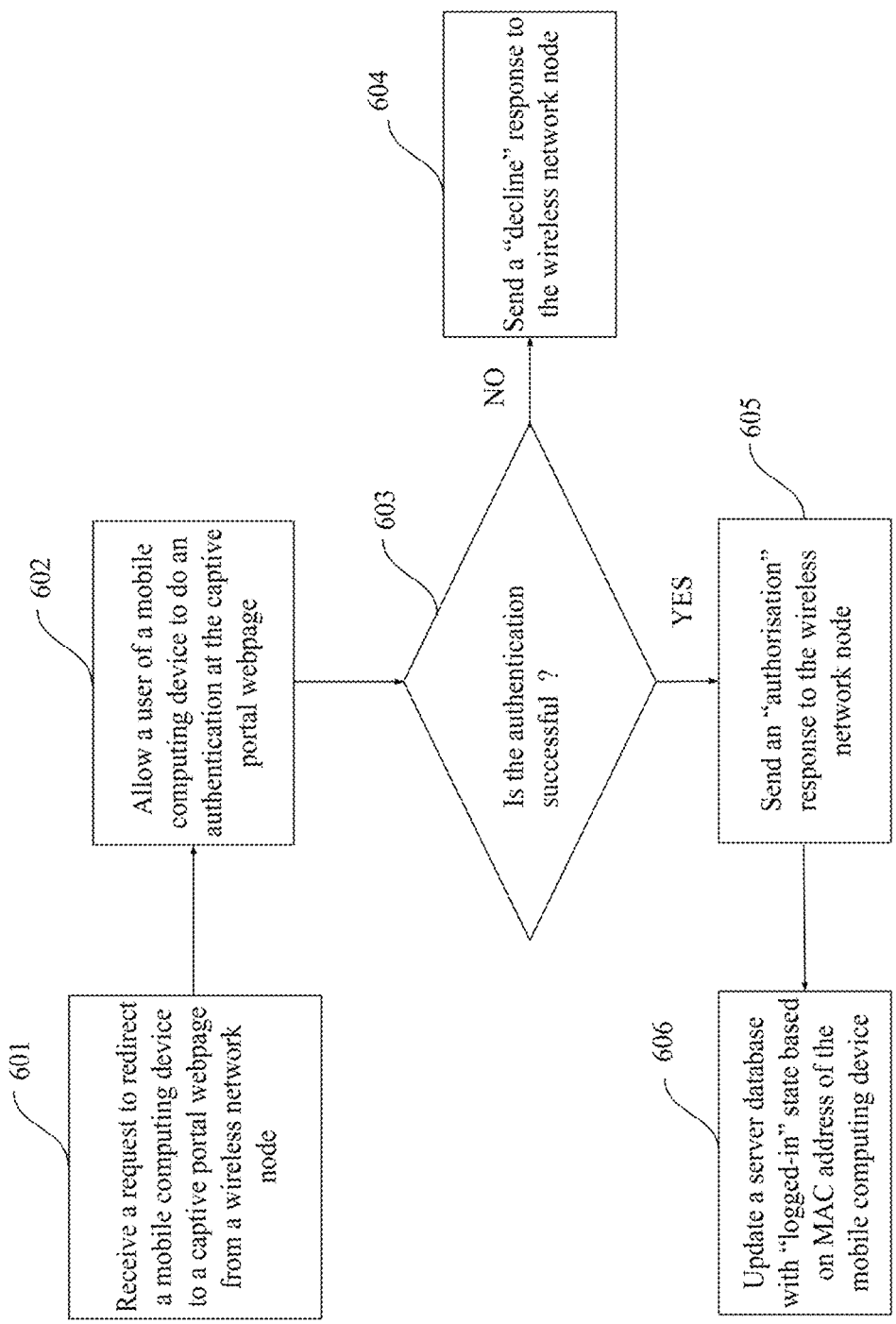
FIG. 6 illustrates a workflow of redirecting a mobile computing device to a captive portal webpage to do an authentication according to one of the embodiments of the present invention.

FIG. 6 illustrates actions performed by server 150 upon receipt of a request for redirecting a mobile computing device 130 to a captive portal webpage from a wireless network node 120. At Step 601, server 150 receives a request for redirecting a mobile computing device 130 to a captive portal webpage from wireless network node 120. At Step 602, server 150 allows the user of mobile computing device 130 to do an authentication. At Step 603, server 150 determines whether the authentication is successful. In one particular embodiment, the authentication is performed by entering a registered username and password of the user of mobile computing device for any one of social media links designated by the administrator of wireless network node 120 at the captive portal webpage as shown in FIG. 7B. The user selects one of the social media at the captive portal webpage and then enters the username and password for the selected social media. If the user enters the username and password correctly, Server 150 will be notified that the authentication is successful and will then send an "authorization" response to wireless network node 120 at Step 605. Server 150 then updates the server database with status of mobile computing device 130 as "Logged-in" state based on the MAC address at Step 606. If the user enters the username and password incorrectly, Server 150 will be notified that the authentication is not successful and will then send a "decline" response to wireless network node 120.

FIGS. 7A to 7B illustrate graphic representations displayed on display panel 140 of mobile computing device 130 for the user of mobile computing device 130 to do the authentication at the captive portal webpage.

FIG. 7A illustrates that a web browser 700 such as MICROSOFT INTERNET EXPLORER, APPLE SAFARI, GOOGLE CHROME or MOZILLA FIREFOX is popped up on display panel 140. The captive portal webpage is shown on web browser 700 as illustrated in FIG. 7B. For example, the captive portal webpage, includes information such as welcome message, conditions for using WLAN connection, disclaimers or any information that the administrator of wireless network node 120 wishes to display at the captive portal webpage. The captive portal webpage further includes three buttons 701, 702 and 703. Buttons 701, 702 and 703 represents a link to Social Media 1, a link to Social Media 2 and a link to Social Media 3 respectively. For example, Social Media 1, Social Media 2 and Social Media 3 represent FACEBOOK, WECHAT, LINKEDIN respectively. The user is allowed to select any one of the social media links that the user already registered, by clicking the corresponding button.

For example, the user already registered Social Media 1 and had corresponding username and password for Social Media 1. The user selects Social Media 1 by clicking button 701 at the captive portal webpage. Web browser 700 will be redirected to a "Log-in" webpage of Social Media 1 as illustrated in FIG. 7C. The user is allowed to enter the username for Social Media 1 at text field 705 and the password for Social Media 1 at text field 706. If the user enters the username and password correctly, an identity of the user is then authenticated. Server 150 will be notified by Social Media 1 that the authentication is successful and will send an authorization response to wireless network node 120. Mobile computing device 130 is allowed to access wireless network node 120 and then communicates with network 110.

Web browser 700 will also display how long WLAN connection period is granted. For example, a WLAN connection period of one hour is granted as illustrated in FIG. 7D. The WLAN connection period is determined by the administrator of wireless network node 120. The WLAN connection period may be ten hours, five hours, two hours, one hours or even 30 minutes. The status of mobile computing device 130 in the server database will be updated as "Not Logged-in" after expiration of the WLAN connection period. Server 150 will also notify wireless network node 120 about the expiration of the WLAN connection period. Wireless network node 120 will update the wireless network node database with status of mobile computing device 130 as "Not Logged-in" or will delete the MAC address of mobile computing device 130 from the wireless network node database.

Figure 2:
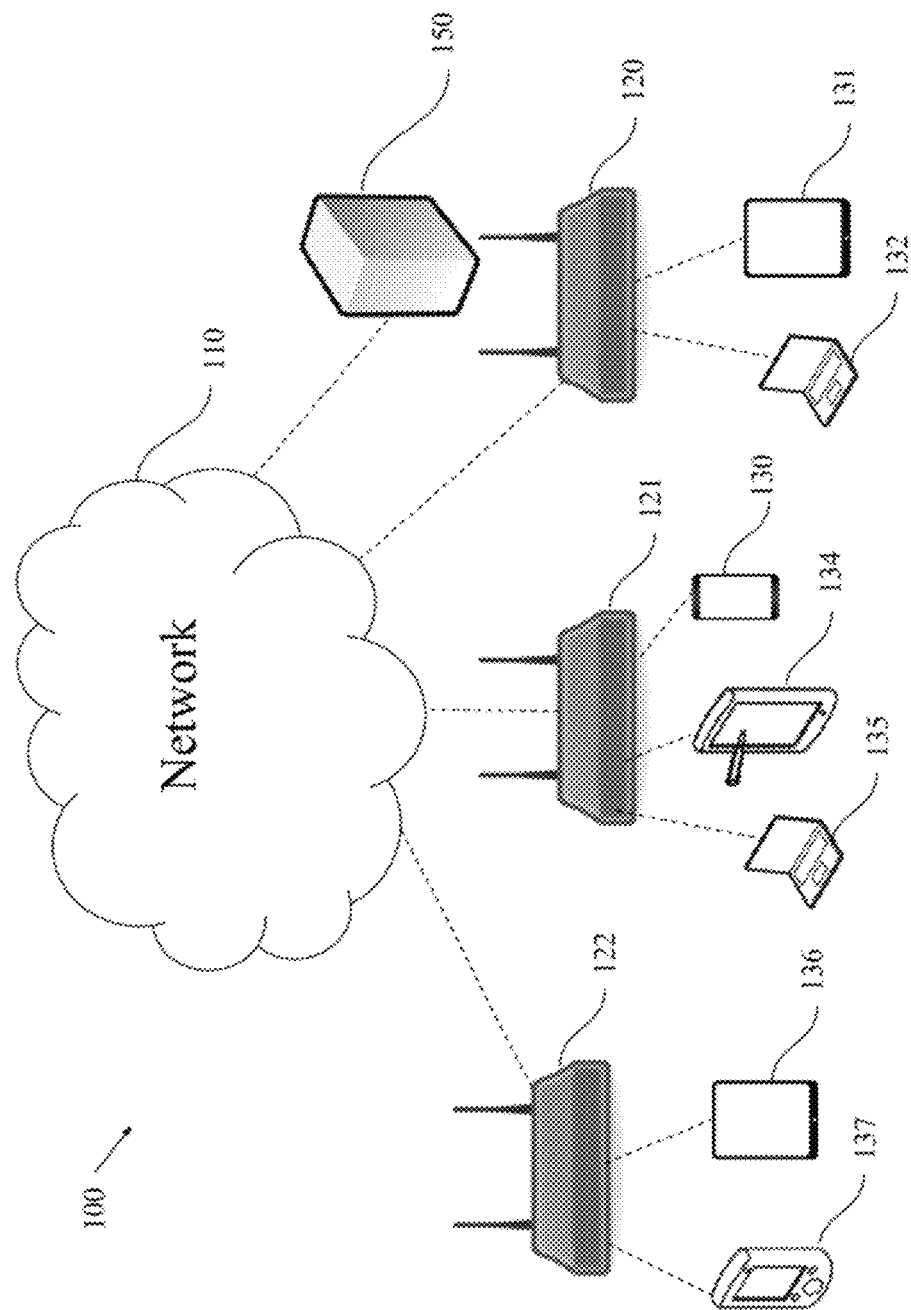
FIG. 2 illustrates a network system with a mobile computing device moving from one wireless network node to another wireless network node according to one of the embodiments of the present invention.

FIG. 2 illustrates mobile computing device 130 moving from a WLAN signal range of wireless network node 120 in FIG. 1 to a WLAN signal range of wireless network 121. The workflow as illustrated in FIG. 4 will be performed by wireless network node 121. At Step 403, for illustration purpose, when the MAC address is not identified in a wireless network node database of wireless network 121, wireless network node 121 will perform Step 405. At Step 407, the status of mobile computing device 130 in server 150 is "Logged-in" because mobile computing device 130 was authenticated at the time that it was connected with wireless network node 120. Wireless network node 121 will then perform Steps 413.

As mobile computing device 130 is out of the WLAN signal range of wireless network node 120, wireless network node 120 is no longer able to detect mobile computing device 130. The MAC address of mobile computing device 130 will then be deleted from the wireless network node database of wireless network node 120 after expiration of a predetermined period, for example five minutes, two minutes or one minute. The predetermined period is determined by the administrator of wireless network node 120.

Figure 8:
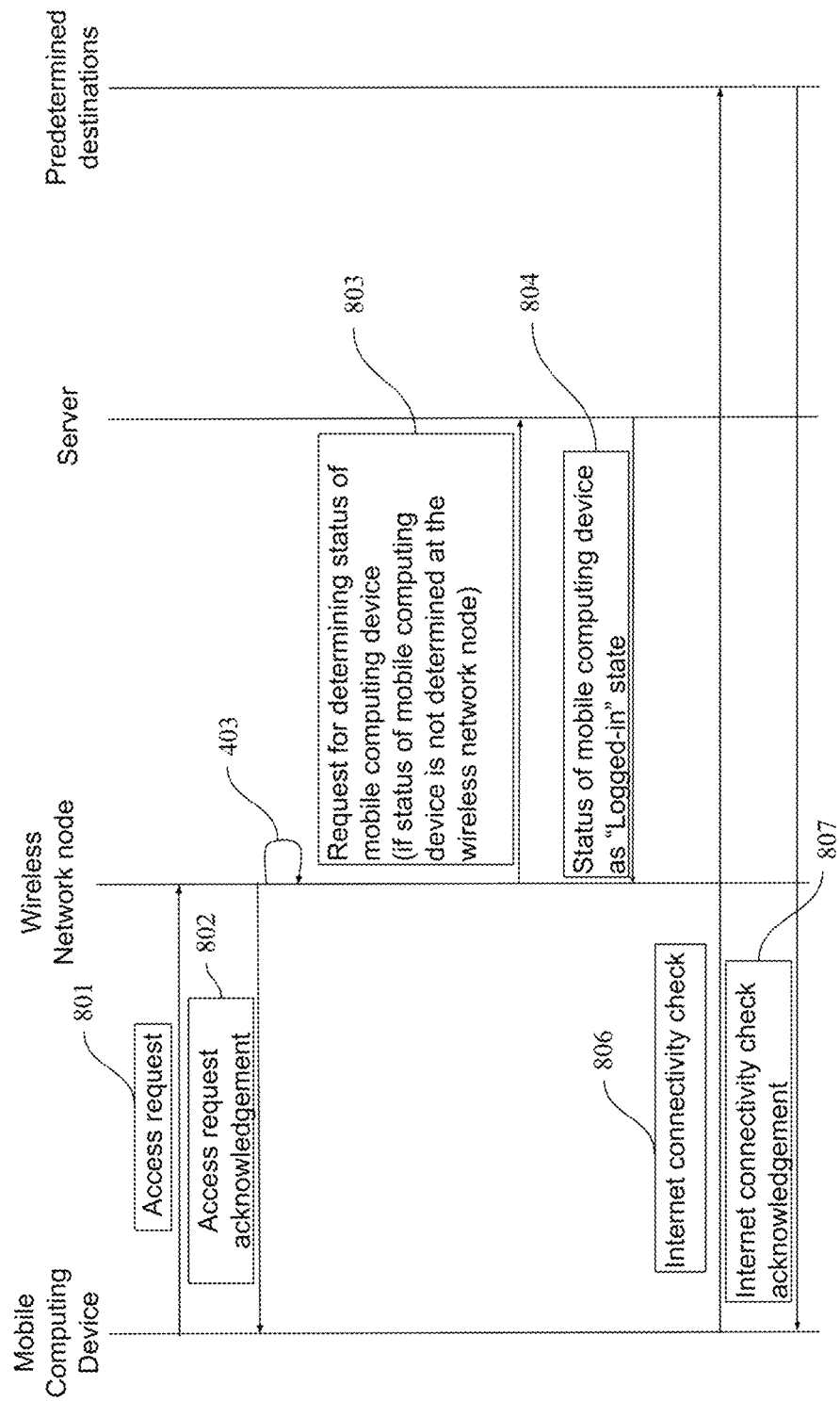
FIG. 8 illustrates a sequence diagram for a scenario that a wireless network node receives status of mobile computing device as "Logged-in" state from a server before the mobile computing device sends Internet connectivity check.

FIG. 8 is a sequence diagram for a scenario that wireless network node 120 receives status of mobile computing device as "Logged-in" state 804 from server 150 before mobile computing device 130 sends Internet connectivity check 806. Mobile computing device 130 sends access request 801 to wireless network node 120 and wireless network node 120 returns access request acknowledge 802 to mobile computing device 130. Wireless network node 120 then determines the status of mobile computing device 130 in the wireless network database based on the MAC address of mobile computing device 130. If the MAC address of mobile computing device 130 is not identified, wireless network node 120 will send request for determining status of mobile computing device 803 in the server database. Wireless network node 120 receives status of mobile computing device as "Logged in" state 804 from server 150 before mobile computing device sends Internet connectivity check 806. Mobile computing device 130 sends Internet connectivity check 806 that will then be received by the predetermined destinations. The predetermined destinations return Internet connectivity check acknowledgement 807 to the mobile computing device 130.

Figure 9:
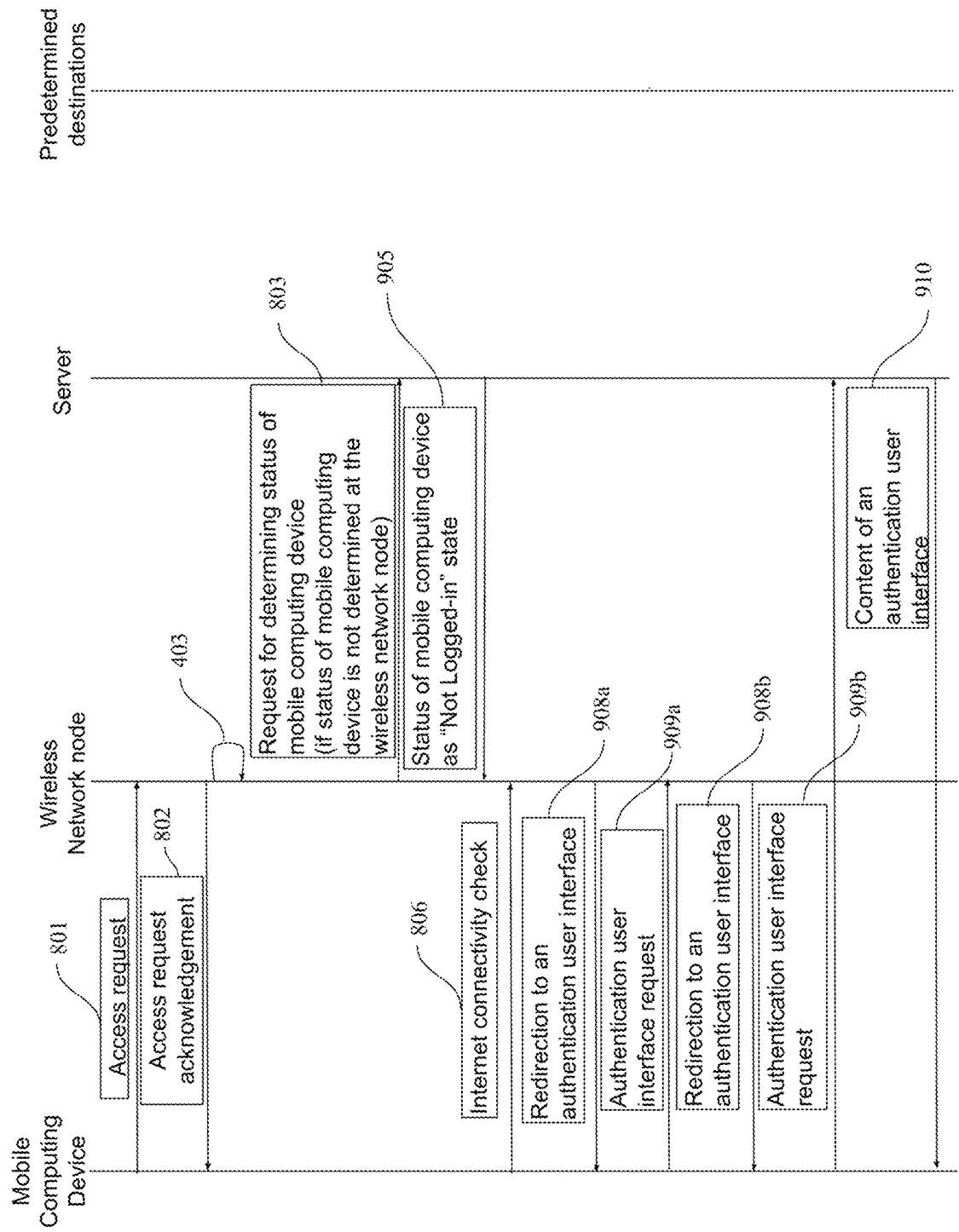
FIG. 9 illustrates a sequence diagram for a scenario that a wireless network node receives status of mobile computing device as "Not Logged-in" state from a server before the mobile computing device sends Internet connectivity check.

FIG. 9 is a sequence diagram for a scenario that wireless network node 120 receives status of mobile computing device as "Not Logged-in" state from server 150 before mobile computing device 130 sends Internet connectivity check 806. Mobile computing device 130 sends access request 801 to wireless network node 120 and wireless network node 120 returns access request acknowledge 802 to mobile computing device 130. Wireless network node 120 then determines the status of mobile computing device 130 in the wireless network database based on the MAC address of mobile computing device 130. If the MAC address of mobile computing device 130 is not identified, wireless network node 120 will send a request for determining status of mobile computing device 803 in the server database. Wireless network node 120 receives status of mobile computing device as "Not Logged-in" state 905 from server 150 before mobile computing device sends Internet connectivity check 806. Wireless network node 120 receives Internet connectivity check 806 from mobile computing device 130. Wireless network node 120 returns "redirection to an authentication user interface" 908a to mobile computing device 130. Mobile computing device 130 then sends authentication user interface request 909a to wireless network node 120. Wireless network node 120 returns "redirection to an authentication user interface" 908b to mobile computing device 130. Mobile computing device 130 then sends authentication user interface request 909b, which is received by server 150. Server 150 sends content of an authentication user interface 910 to mobile computing device 130.

FIG. 10 is a sequence diagram for a scenario that wireless network node 120 receives status of mobile computing device as "Logged-in" state 804 from server 150 before the mobile computing device 130 sends authentication user interface request 909. Mobile computing device 130 sends access request 801 to wireless network node 120 and wireless network node 120 returns access request acknowledge 802 to mobile computing device 130. Wireless network node 120 then determines status of mobile computing device 130 in the wireless network database based on the MAC address of mobile computing device 130. If the MAC address of mobile computing device 130 is not identified, wireless network node 120 will send request for determining status of mobile computing device 803 in the server database. Mobile computing device 130 sends Internet connectivity check 806 to wireless network node 120 and wireless network node 120 returns "redirection to an authentication user interface" 908 to mobile computing device 130. Before mobile computing device 130 sends authentication interface request 909, wireless network node receives status of mobile computing device as "Logged-in" state 804 from server 150. Mobile computing device 130 then sends authentication interface request 909, which will be received by the predetermined destinations. The predetermined destination then sends authentication user interface request acknowledgement 809 to mobile computing device 130.

Figure 11:
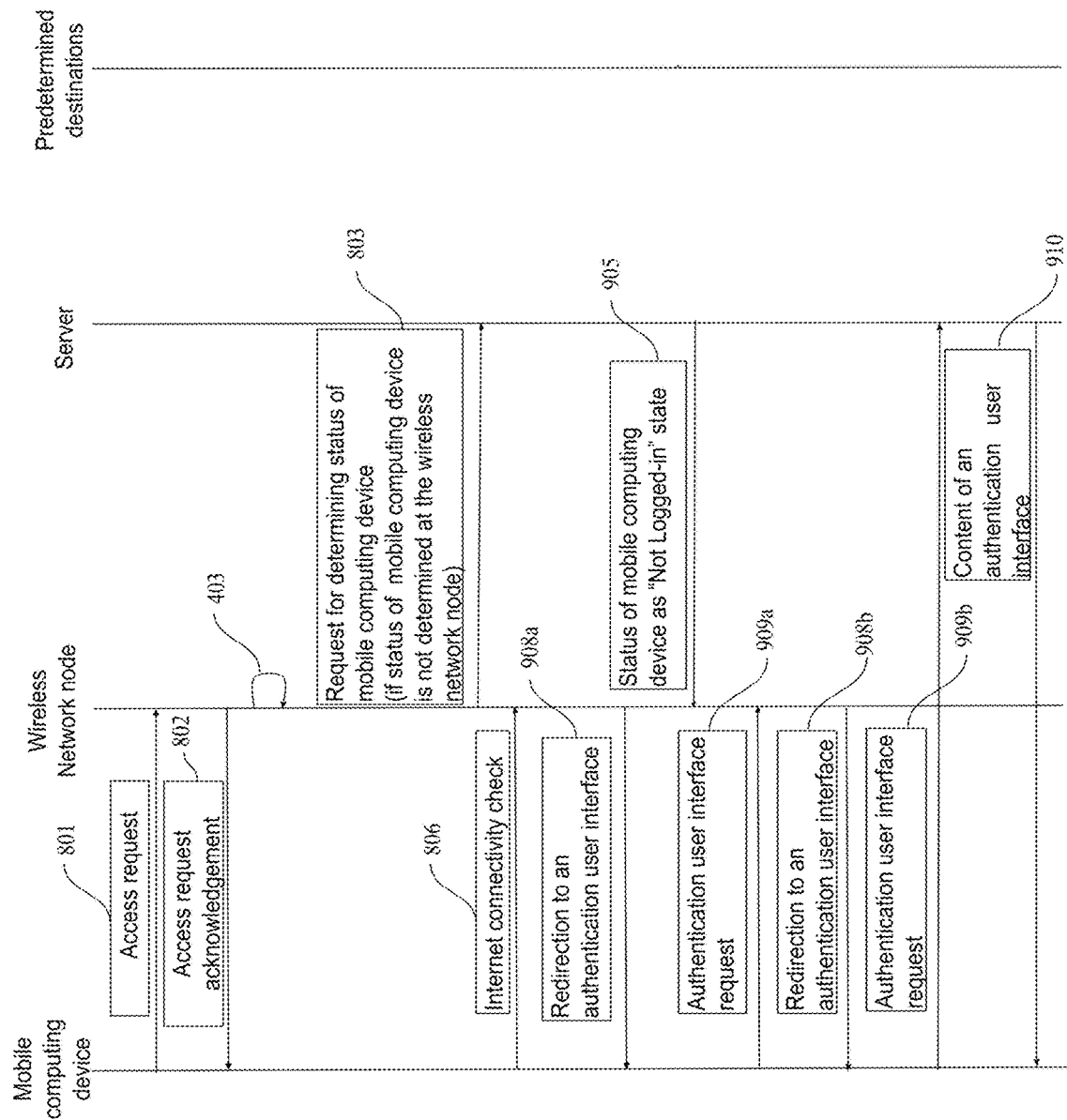
FIG. 11 illustrates a sequence diagram for a scenario that a wireless network node receives status of mobile computing device as "Not Logged-in" state from a server before the mobile computing device sends an authentication user interface request.

FIG. 11 is a sequence diagram for a scenario that wireless network node 120 receives status of mobile computing device as "Not Logged-in" state 905 from server 150 before mobile computing device 130 sends authentication user interface request 909. Mobile computing device 130 sends access request 801 to wireless network node 120 and wireless network node 120 returns access request acknowledge 802 to mobile computing device 130. Wireless network node 120 then determines the status of mobile computing device 130 in the wireless network database based on the MAC address of mobile computing device 130. If the MAC address of mobile computing device 130 is not identified, wireless network node 120 will send request for determining status of mobile computing device 803 in the server database. Mobile computing device 130 sends Internet connectivity check 806 to wireless network node 120 and wireless network node 120 returns "redirection to an authentication user interface" 908a to mobile computing device 130. Before mobile computing device 130 sends authentication interface request 909a, wireless network node receives status of mobile computing device as "Not Logged-in" state 905 from server 150. Wireless network 120 then receives authentication interface request 909a from mobile computing device 130. Wireless network node 120 returns "redirection to an authentication user interface" 908b to mobile computing device 130. Mobile computing device 130 sends authentication user interface request 909b, which is allowed to be transmitted to server 150. Server 150 sends content of an authentication user interface 910 to mobile computing device 130.

Figure 12:
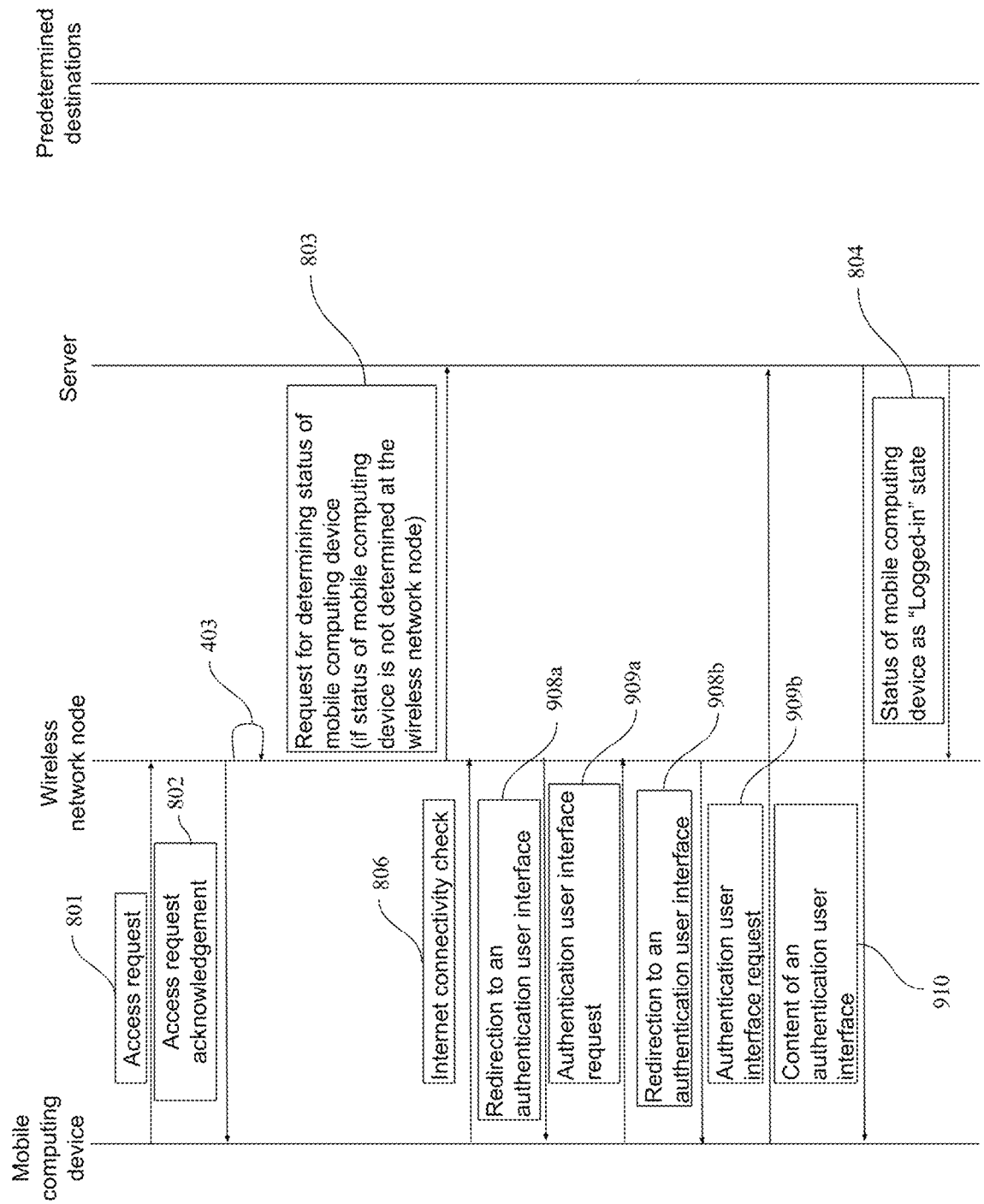
FIG. 12 illustrates a sequence diagram for a scenario that a wireless network node receives status of mobile computing device as "Logged-in" state from a server after the mobile computing device receives content of an authentication user interface from the server.

FIG. 12 is a sequence diagram for a scenario that wireless network node 120 receives status of mobile computing device as "Logged-in" state from server 150 after mobile computing device 130 receives content of an authentication user interface 910 from server 150. Mobile computing device 130 sends access request 801 to wireless network node 120 and wireless network node 120 returns access request acknowledge 802 to mobile computing device 130. Wireless network node 120 then determine the status of mobile computing device 130 in the wireless network database based on the MAC address of mobile computing device 130. If the MAC address of mobile computing device 130 is not identified, wireless network node 120 will send request for determining status of mobile computing device 803 in the server database. Mobile computing device 130 sends Internet connectivity check 806 to wireless network node 120 and wireless network node 120 returns "redirection to an authentication user interface" 908a to mobile computing device 130. Mobile computing device 130 then sends authentication user interface request 909a to wireless network node 120. Wireless network node 120 returns "redirection to an authentication user interface" 908b to mobile computing device 130. Mobile computing device 130 then sends authentication user interface request 908b, which is allowed to be transmitted to server 150. Server 150 sends content of an authentication user interface 910 to mobile computing device 130. After server 150 sends content of an authentication user interface 910 to mobile computing device 130, wireless network node 120 receives status of mobile computing device as "Logged-in" state 804 from server 150.

Figure 13:
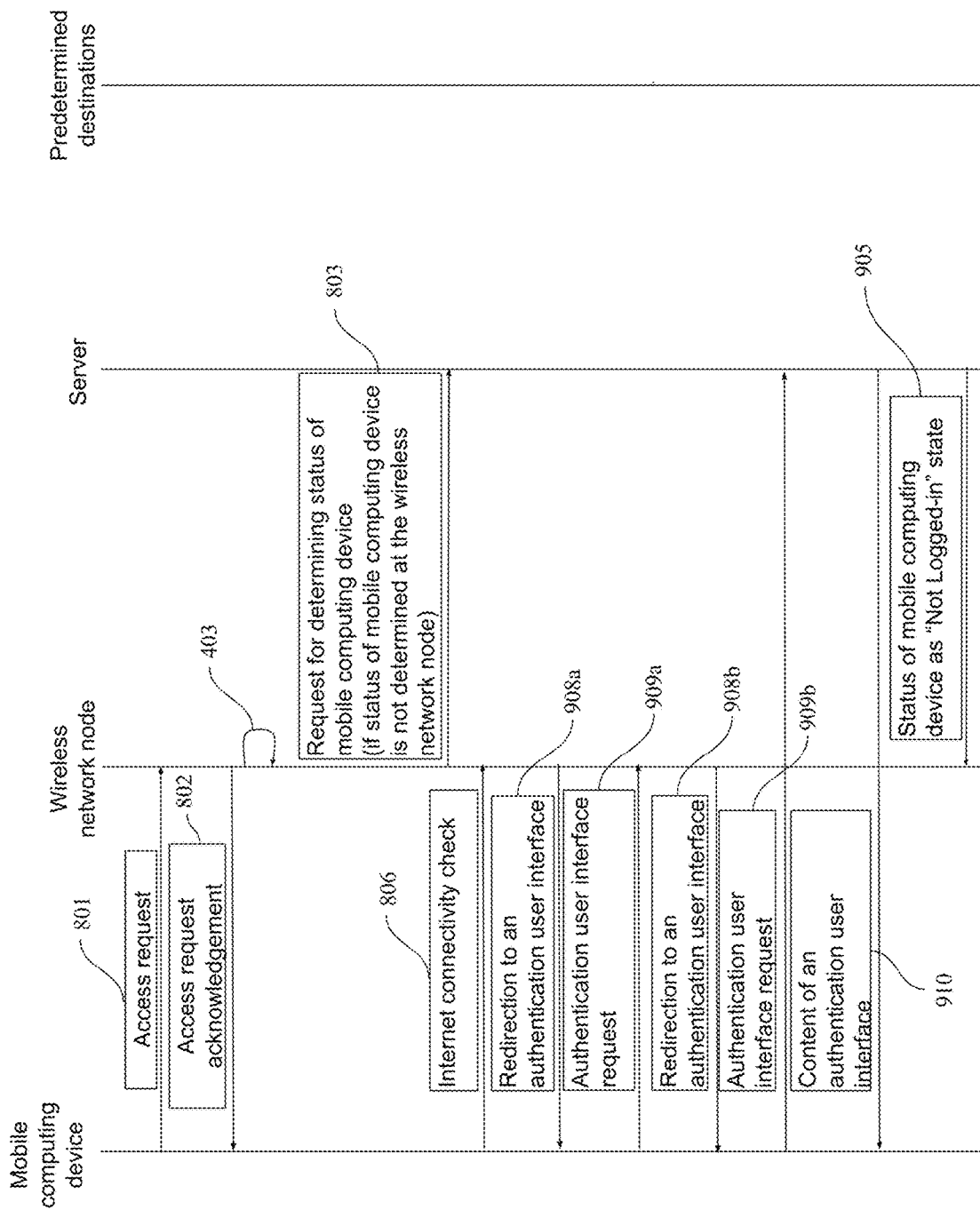
FIG. 13 illustrates a sequence diagram for a scenario that a wireless network node receives status of mobile computing device as "Not Logged-in" state from a server after the mobile computing device receives content of an authentication user interface from the server.

FIG. 13 is a sequence diagram for a scenario that wireless network node 120 receives status of mobile computing device as "Not Logged-in" state from server 150 after mobile computing device 130 receives response with content of an authentication user interface 910 from server 150. Mobile computing device 130 sends access request 801 to wireless network node 120 and wireless network node 120 returns access request acknowledge 802 to mobile computing device 130. Wireless network node 120 then determines the status of mobile computing device 130 in the wireless network database based on the MAC address of mobile computing device 130. If the MAC address of mobile computing device 130 is not identified, wireless network node 120 will send request for determining status of mobile computing device 803 in the server database. Mobile computing device 130 sends Internet connectivity check 806 to wireless network node 120 and wireless network node 120 returns "redirection to an authentication user interface" 908a to mobile computing device 130. Mobile computing device 130 then sends authentication user interface request 909a to wireless network node 120. Wireless network node 120 returns "redirection to an authentication user interface" 908b to mobile computing device 130. Mobile computing device 130 then sends authentication user interface request 90b, which is allowed to be transmitted to server 150. Server 150 sends content of authentication user interface 910 to mobile computing device 130. After server 150 sends content of an authentication user interface 910 to mobile computing device 130, wireless network node 120 receives status of mobile computing device as "Not Logged-in" state 905 from server 150.

In a scenario illustrated in FIG. 12, content of an authentication user interface 910 is transmitted to mobile computing device 130 before wireless network node 120 receives status of mobile computing device as "Logged-in" state 804 from server 105. In this scenario web browser 700 is redirected to the captive portal webpage before wireless network node 120 receives status of mobile computing device as "Logged-in" state 804 from server 105 and the status of mobile computing device 130 is "Logged-in" state as the mobile computing device was authenticated already. Therefore, it is not desirable for the user of mobile computing device 130 to do the authentication again. However, the sequence of response illustrated in FIG. 12 requires to the user to do the authentication one more time even the status of mobile computing device 130 is "Logged-in" state in the server database.

The workflow as illustrated in FIG. 4 with Step 405, wireless network node 120 is able to wait for the status of mobile computing device to be received from server 150 before processing Internet connectivity check 806, instead of processing Internet connectivity check 806 right after receiving it. By performing action of Step 405, web browser 700 will not be redirected to the captive portal webpage when the status of mobile computing device 130 is "Logged-in" state in the server database.

Figure 16:
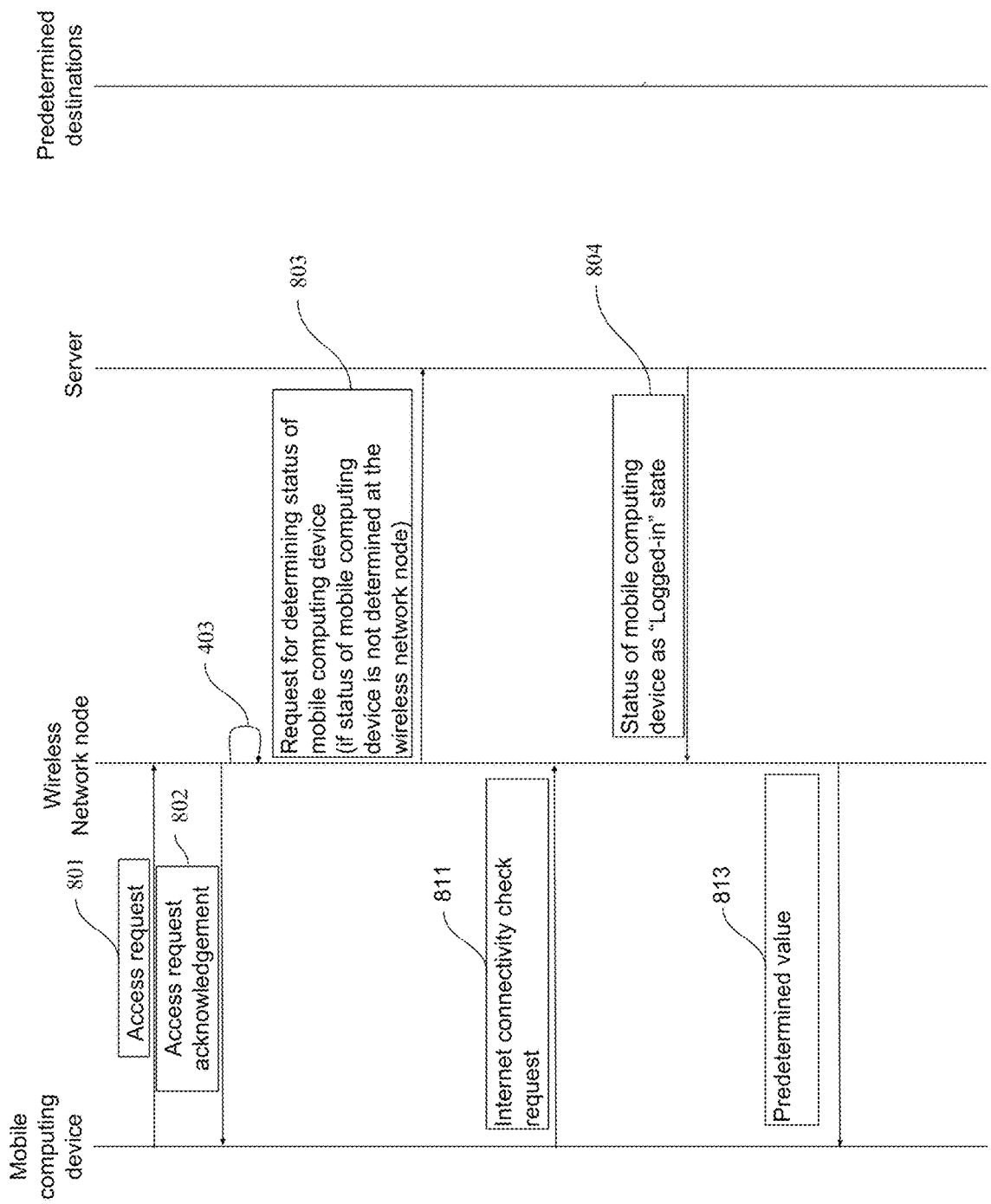
FIG. 16 is a sequence diagram for a scenario that a wireless network node receives status of mobile computing device as "Logged-in" state from a server before sending a predetermined value subject to an operating system used by a mobile computing device.

FIG. 16 is a sequence diagram for a scenario that wireless network node 120 receives status of mobile computing device as "Logged-in" state 804 from server 150 before sending a predetermined value subject to an operating system used by mobile computing device 130. Mobile computing device 130 sends access request 801 to wireless network node 120 and wireless network node 120 returns access request acknowledge 802 to mobile computing device 130. Wireless network node 120 then determines the status of mobile computing device 130 in the wireless network database based on the MAC address of mobile computing device 130. If the MAC address of mobile computing device 130 is not identified, wireless network node 120 will send request for determining status of mobile computing device 803 in the server database to server 150.

Mobile computing device 130 will then transmit Internet connectivity check request 811 to a Uniform Resource Locator (URL) designated by vendor of mobile computing device 130 or vendor of an operating system used by mobile computing device 130 via wireless network node 120. When wireless network note receives Internet connectivity check request 811, wireless network node 120 will wait for status of mobile computing device to be received from server 150, instead of sending redirection to an authentication user interface 908a as illustrated in FIG. 12. When wireless network node 120 receives status of mobile computing device as "Logged-in" state 804 from server 150, wireless network node 120 then sends predetermined value 813 to mobile computing device 130 based on status of mobile computing device as "Logged-in" state 804.

The URL that Internet connectivity check request 811 transmitted to depends on an operating system used by mobile computing device 130. For example, if the operating system used by mobile computing device 130 is IOS or MAC OS, Internet connectivity check request 811 is usually transmitted to URL of "www.apple.com/library/test/success.html" designated by Apple Inc. If the operating system used by mobile computing device 130 is Android or Chrome, Internet connectivity check request 811 is usually transmitted to URL of "clients1.google.com/generate_204" designated by Google Inc. If the operating system used by mobile computing device 130 is Windows or Windows Mobile, Internet connectivity check request 811 is usually transmitted to URL of "www.msftncsi.com/ncsi.txt" or "www.msftconnecttest.com/connecttest.txt" designated by Microsoft Inc.

Predetermined value 813 is prepared by vendor of wireless network node 120, an administrator of wireless network node 120, a supplier of server 150 or vendor of server 150 based on a corresponding response made by the URL that Internet connectivity check request 811 is transmitted to. For example, the operating system used by mobile computing device 130 is IOS or MAC OS, predetermined value 813 is usually "<HTML><HEAD><TITLE>Success</TITLE></HEAD><BODY>Success</BODY></HTML>" received from "www.apple.com/library/test/success.html". If the operating system used by mobile computing device 130 is Android or Chrome, predetermined value 813 is usually HTTP header "HTTP/1.1 204 No Content Content-Length: 0 Date: Tue, 9 May 2017 03:11:06 GMT Age: 0 Connection: keep-alive" received from "clients1.google.com/generate_204". If the operating system used by mobile computing device 130 is Windows or Windows Mobile, predetermined value 813 is usually "Microsoft NCSI" received from "www.msftncsi.com/ncsi.txt" or "www.msftconnecttest.com/connecttest.txt".

For one particular example, an operating system used by mobile computing device 130 does not have corresponding predetermined value 813, mobile computing device 130 will then be redirected to the captive portal webpage.

The sequence of responses as illustrated in FIG. 16 reduces the chance for redirecting mobile computing device 130 to the captive portal webpage in comparison with sequence responses as illustrated in FIG. 12 when the status of mobile computing device 130 is "Logged-in" state in the server database because wireless network node 120 waits for status of mobile computing device to be received from server 150.

Figure 17:
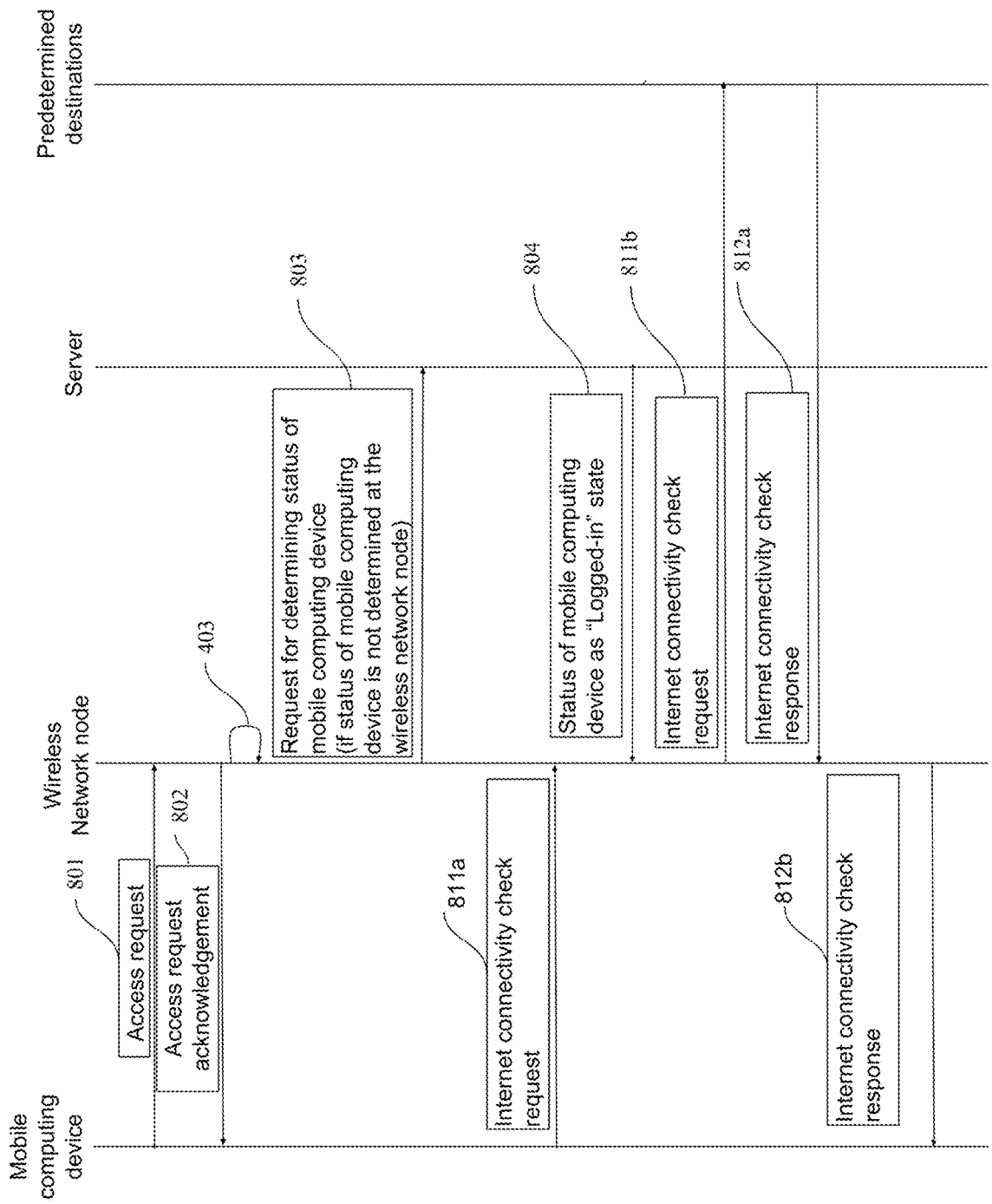
FIG. 17 is a sequence diagram for a scenario that a wireless network node receives status of mobile computing device as "Logged-in" state from a server and directs Internet connectivity check request received from a mobile computing device to a predetermined destination.

FIG. 17 is a sequence diagram for a scenario that wireless network node 120 receives status of mobile computing device as "Logged-in" state 804 from server 150 and directs Internet connectivity check request 811 received from mobile computing device 130 to a predetermined destination. Mobile computing device 130 sends access request 801 to wireless network node 120 and wireless network node 120 returns access request acknowledge 802 to mobile computing device 130. Wireless network node 120 then determines the status of mobile computing device 130 in the wireless network database based on the MAC address of mobile computing device 130. If the MAC address of mobile computing device 130 is not identified, wireless network node 120 will send request for determining status of mobile computing device 803 in the server database to server 150.

Mobile computing device 130 will then transmit Internet connectivity check request 811a to a predetermined destination or URL based on an operating system used by mobile computing device 130, via wireless network node 120. When wireless network node 120 receives Internet connectivity check request 811a, wireless network node 120 will wait for status of mobile computing device to be received from server 150. When wireless network node 120 receives status of mobile computing device as "Logged-in" state 804 from server 150, wireless network node 120 directs Internet connectivity check request 811b to the predetermined destination. The predetermined destination will return Internet connectivity check response 812a to wireless network node 120. Wireless network node 120 will then direct Internet connectivity check response 812b to mobile computing device 130. Internet connectivity check response 812a and 812b may be a binary, a string, a character or a text.

The sequence of responses as illustrated in FIG. 17 will reduce the chance for redirecting mobile computing device 130 to the captive portal webpage in comparison with sequence responses as illustrated in FIG. 12 because wireless network node 120 waits for status of mobile computing device to be received from server 150.

One of the benefits of sequence of responses of FIG. 16 is shorter response time for mobile computing device 130 to receive predetermined value 813 from wireless network node 120, in comparison with receiving Internet connectivity check response 812a and 812b from the predetermined destination. It is because predetermined value 813 has already cached in wireless network node 120.

Figure 18:
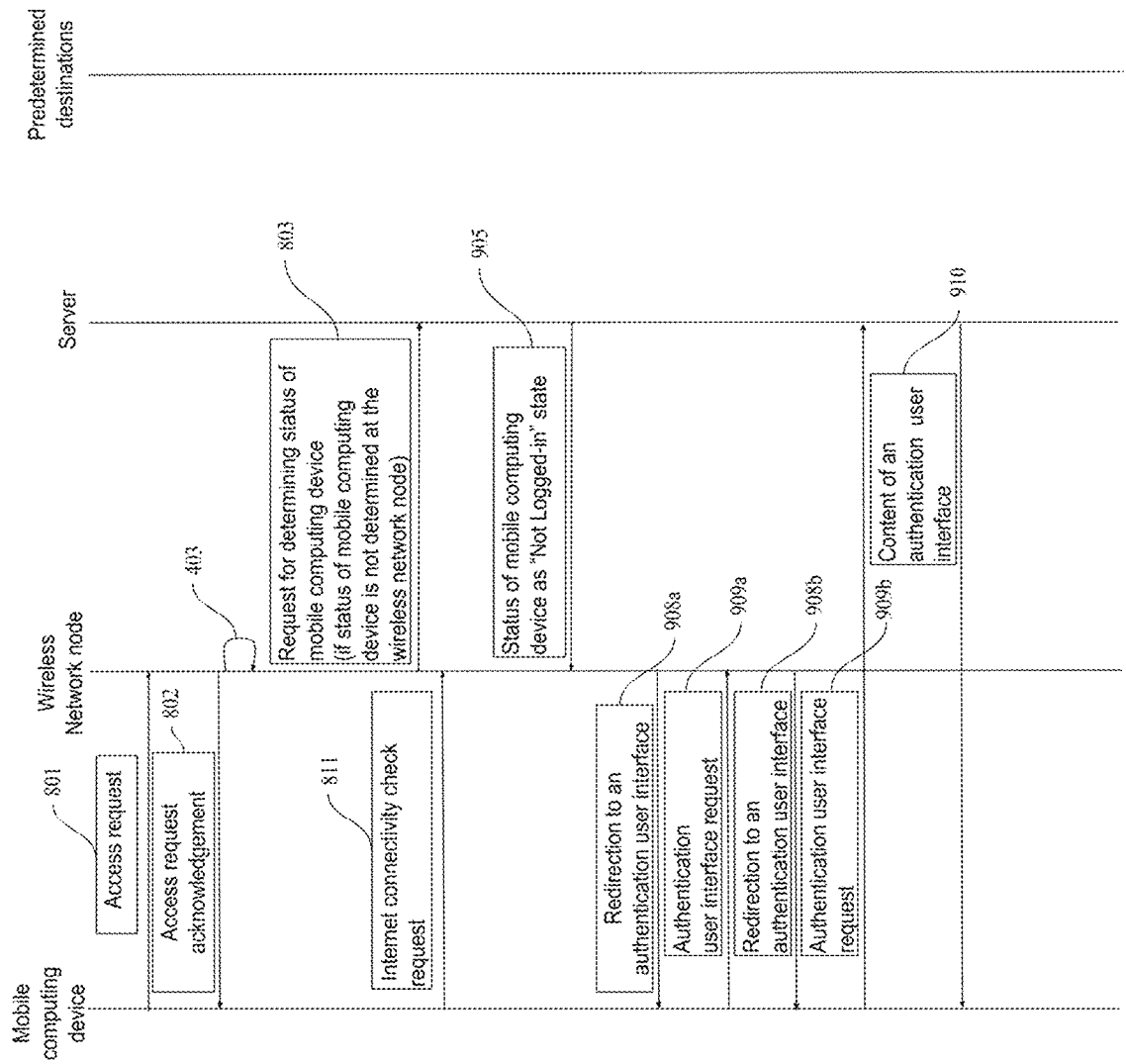
FIG. 18 is a sequence diagram for indicating that a wireless network node receives status of mobile computing device as "Not Logged-in" state from a server before sending redirection to an authentication user interface.

FIG. 18 is a sequence diagram for a scenario that wireless network node 120 receives status of mobile computing device as "Not Logged-in" state 905 from server 150 before sending redirection to an authentication user interface 908a. Mobile computing device 130 sends access request 801 to wireless network node 120 and wireless network node 120 returns access request acknowledge 802 to mobile computing device 130. Wireless network node 120 then determines the status of mobile computing device 130 in the wireless network database based on the MAC address of mobile computing device 130. If the MAC address of mobile computing device 130 is not identified, wireless network node 120 will send request for determining status of mobile computing device 803 in the server database to server 150.

When wireless network node 120 receives Internet connectivity check request 811, wireless network node will wait for status of mobile computing device to be received from server 150. When wireless network node 120 receives status of mobile computing device as "Not Logged-in" state from server 150, wireless network node 120 then sends redirection to an authentication user interface 908a to mobile computing device 130. Mobile computing device 130 sends authentication user interface request 909a to wireless network node 120. Wireless network node 120 returns "redirection to an authentication user interface" 908b to mobile computing device 130. Mobile computing device 130 then sends authentication user interface request 90b, which is allowed to be transmitted to server 150. Server 150 sends content of authentication user interface 910 to mobile computing device 130.

The invention claimed is:

1. A method for processing data packets originated from a mobile computing device to destinations at a wireless network node comprising:
   (A) detecting an access request from the mobile computing device;
   (B) returning an access request acknowledgment to the mobile computing device;
   (C) determining an identifier of the mobile computing device; and
   (D) determining, based on the identifier, whether status of the mobile computing device is a first state or a second state in a wireless network node database:
      (a) when the identifier is identified in the wireless network node database and the status of the mobile computing device is the first state in the wireless network node database, allowing the mobile computing device to transmit the data packets to the destinations;
      (b) when the identifier is not identified in the wireless network node database and the status of the mobile computing device is the second state in the wireless network node database;
         (I) redirecting the mobile computing device to perform an authentication;
         (II) receiving a response from a server; and
         (III) determining, based on the response and the identifier, whether the status of the mobile computing device is the first state or the second state in a server database:
            (i) when the identifier is identified in the server database and the status of the mobile computing device is the first state in the server database, allowing the mobile computing device to transmit the data packets to the destinations; and
            (ii) when the identifier is identified in the server database and the status of the mobile computing device is the second state in the server database, not allowing the mobile computing device to transmit the data packets to the destinations;
   wherein:
      the mobile computing device is located within a wireless local area network (WLAN) signal range of the wireless network node;
      the wireless network node is configured to detect the mobile computing device;
      the first state indicates the mobile computing device is successfully authenticated; and the second state indicates the mobile computing device is not successfully authenticated.

2. The method of claim 1, further comprising:
after the response is received from the server and when the status of the mobile computing device is the first state in the server database, updating the status of the mobile computing device with the first state in the wireless network node database;
wherein the first state relates to an identity of a user of the mobile computing device being successfully authenticated.

3. The method of claim 1, further comprising:
after the response is received from the server and when the status of the mobile computing device is the second state in the server database, updating the status of the mobile computing device with the second state in the wireless network node database;
wherein the second state relates to an identity of a user of the mobile computing device not being successfully authenticated.

4. The method of claim 1, wherein:
the mobile computing device is connected to the wireless network node via a WLAN connection; and
the authentication is performed through a captive portal webpage using at least one web browser of the mobile computing device by a user of the mobile computing device.

5. The method of claim 4, wherein the captive portal webpage includes a plurality of social media links for the user of the mobile computing device to select to perform the authentication.

6. The method of claim 1, further comprising:
when the identifier is not identified in the wireless network node database, suspending to process the data packets received from the mobile computing device;
wherein the identifier is a Media Access Control (MAC) address of the mobile computing wireless device.

7. The method of claim 1, further comprising:
sending a request to the server to determine the status of the mobile computing device in the server database;
wherein the response received from the server at step (D)(b)(II) includes the status of mobile computing device.

8. The method of claim 1, further comprising:
sending a request to the server to redirect the mobile computing device to perform the authentication.

9. The method of claim 1, further comprising:
receiving one or more Internet connectivity checks from the mobile computing device.

10. The method of claim 9, further comprising:
discarding the one or more Internet connectivity checks received from the mobile computing device until receiving the status of the mobile computing device from the server.

11. A system at a wireless network node for processing data packets originated from a mobile computing device to destinations, wherein the system comprises:
at least one network interface;
at least one processing unit;
at least one main memory; and
at least one non-transitory computer readable medium storing program instructions executable by the at least one processing unit and configured to cause the at least one processing unit to perform:
  (A) detecting an access request from the mobile computing device;
  (B) returning an access request acknowledgment to the mobile computing device;
  (C) determining an identifier of the mobile computing device; and
  (D) determining, based on the identifier, whether status of the mobile computing device is a first state or a second state in a wireless network node database:
    (a) when the identifier is identified in the wireless network node database and the status of the mobile computing device is the first state in the wireless network node database, allowing the mobile computing device to transmit the data packets to the destinations;
    (b) when the identifier is not identified in the wireless network node database and the status of the mobile computing device is the second state in the wireless network node database:
      (I) redirecting the mobile computing device to perform an authentication;
      (II) receiving a response from a server; and
      (III) determining, based on the response and the identifier, whether the status of the mobile computing device is the first state or the second state in a server database:
        (i) when the identifier is identified in the server database and the status of the mobile computing device is the first state in the server database, allowing the mobile computing device to transmit the data packets to the destinations; and
        (ii) when the identifier is identified in the server database and the status of the mobile computing device is the second state in the server database, not allowing the mobile computing device to transmit the data packets to the destinations;
wherein:
  the mobile computing device is located within a wireless local area network (WLAN) signal range of the wireless network node;
  the wireless network node is configured to detect the mobile computing device;
  the first state indicates the mobile computing device is successfully authenticated; and
  the second state indicates the mobile computing device is not successfully authenticated.

12. The system of claim 11, wherein the at least one non-transitory computer readable medium further comprises program instructions executable by the at least one processing unit and configured to cause the at least one processing unit to perform:
after the response is received from the server and when the status of the mobile computing device is the first state in the server database, updating the status of the mobile computing device with the first state in the wireless network node database;
wherein the first state relates to an identity of a user of the mobile computing device being successfully authenticated.

13. The system of claim 11, wherein the at least one non-transitory computer readable medium further comprises program instructions executable by the at least one processing unit and configured to cause the at least one processing unit to perform:
after the response is received from the server and when the status of the mobile computing device is the second state in the server database, updating the status of the mobile computing device with the second state in the wireless network node database;

wherein the second state relates to an identity of a user of the mobile computing device not being successfully authenticated.

14. The system of claim 11, wherein:
the mobile computing device is connected to the wireless network node via a WLAN connection; and
the authentication is performed through a captive portal webpage using at least one web browser of the mobile computing device by a user of the mobile computing device.

15. The system of claim 14, wherein the captive portal webpage includes a plurality of social media links for the user of the mobile computing device to select to perform the authentication.

16. The system of claim 11, wherein the at least one non-transitory computer readable medium further comprises program instructions executable by the at least one processing unit and configured to cause the at least one processing unit to perform:
when the identifier is not identified in the wireless network node database, suspending to process the data packets received from the mobile computing device;
wherein the identifier is a Media Access Control (MAC) address of the mobile computing device.

17. The system of claim 11, wherein the at least one non-transitory computer readable medium further comprises program instructions executable by the at least one processing unit and configured to cause the at least one processing unit to perform:
sending a request to the server to determine the status of the mobile computing device in the server database;
wherein the response received from the server at step (D)(b)(II) includes the status of mobile computing device.

18. The system of claim 11, wherein the at least one non-transitory computer readable medium further comprises program instructions executable by the at least one processing unit and configured to cause the at least one processing unit to perform:
sending a request to the server to redirect the mobile computing device to perform the authentication.

19. The system of claim 11, wherein the at least one non-transitory computer readable medium further comprises program instructions executable by the at least one processing unit and configured to cause the at least one processing unit to perform:
receiving one or more Internet connectivity checks from the mobile computing device.

20. The system of claim 19, wherein the at least one non-transitory computer readable medium further comprises program instructions executable by the at least one processing unit and configured to cause the at least one processing unit to perform:
discarding the one or more Internet connectivity checks received from the mobile computing device until receiving the status of the mobile computing device from the server.

* * * * *